(12) United States Patent
Grechanik et al.

(10) Patent No.: US 7,979,846 B2
(45) Date of Patent: Jul. 12, 2011

(54) AUTOMATIC TEST GENERATION FOR REFERENCE TESTING

(75) Inventors: Mark Grechanik, Chicago, IL (US); Kevin Michael Conroy, Evanston, IL (US); Matthew Hellige, Chicago, IL (US); Edy S. Liongosari, Wheeling, IL (US); Qing Xie, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1104 days.

(21) Appl. No.: 11/784,121

(22) Filed: Apr. 5, 2007

(65) Prior Publication Data

US 2008/0250051 A1 Oct. 9, 2008

(51) Int. Cl.
*G06F 9/44* (2006.01)
(52) U.S. Cl. .................................................. 717/124
(58) Field of Classification Search .................. 717/124
See application file for complete search history.

(56) References Cited

U.S. PATENT DOCUMENTS

| | | | | |
|---|---|---|---|---|
| 7,653,896 | B2* | 1/2010 | Herdeg, III | 717/113 |
| 2005/0278728 | A1* | 12/2005 | Klementiev | 719/328 |
| 2006/0005132 | A1* | 1/2006 | Herdeg | 715/704 |
| 2007/0234293 | A1* | 10/2007 | Noller et al. | 717/124 |
| 2008/0209446 | A1* | 8/2008 | Grechanik et al. | 719/320 |

OTHER PUBLICATIONS

Compuware, The Leader in IT Value, "Accelerate Testing and Deliver High Quality Applications on Time," 2008 Compuware Corporation, 2 pages.

Grechanik et al., "Reducing Effort in Script-Based Testing," Accenture Technology Labs, Systems Integration Group, Chicago, Illinois, Nov. 11, 2007, pp. 1-22.

Hewlett-Packard Development Company, "HP Functional Testing Software, BTO Software," 2008, 1 page.

Hewlett-Packard Development Company, HP QuickTest Professional Software, data sheet, 2007, 4 pages.

Pierce, Benjamin C., "Types and Programming Languages," The MIT Press, Cambridge, Massachusetts, 2008, ISBN 0-262-16209-1, complete book.

Brad A. Myers, "*User Interface Software Technology*", Human Computer Interaction Institute, Carnegie Mellon University, ACM Computing Surveys, vol. 28, No. 1, Mar. 1996, (bam@cs.cmu.edu), (3 pages).

Aske Simon et al., "*Extending Java for High-Level Web Service Construction*", University of Aarhus, ACM Transactions on Programming Language and Systems, vol. 25, No. 6, Nov. 2003, pp. 814-875.

(Continued)

*Primary Examiner* — Philip Wang
(74) *Attorney, Agent, or Firm* — Brinks Hofer Gilson & Lione

(57) ABSTRACT

A system for application reference testing (SMART) solves the technical problem of generating test data and test cases from graphical user interface applications (GAPs) to test web services, effectively and non-invasively. SMART allows organizations to easily and promptly identify and resolve software bugs, ensure higher quality software and development productivity, complete software projects faster, deliver software products to market quicker, and improve the return on investment for software development projects. SMART provides a user friendly visualization mechanism that interacts with an accessibility layer to enable organizations economically and easily define user interactions with GAPs, by performing point-and-click, drag-and-drop operations on the GAPs, and generate reusable test data and test cases for web services.

26 Claims, 26 Drawing Sheets

OTHER PUBLICATIONS

Rob Sinclair, Accessibility Technical Article, "*Microsoft Active Accessibility: Architecture*", May 2000, pp. 1-7.

Arad A. Myers, "*User Interface Software Technology*", Human Computer Interaction Institute, Carnegie Mellon University, ACM Computing Surveys, vol. 28, No. 1, Mar. 1996, (Aam@cs.cmu.edu), (3 pages).

Aske Simon et al., "*Extending Java for High-Level WeA Service Construction*", University of Aarhus, ACM Transactions on Programming Language and Systems, vol. 25, No. 6, Nov. 2003, pp. 814-875.

Rob Sinclair, Accessibility Technical Article, "*Microsoft Active Accessibility: Architecture*", May 2000, pp. 1-7.

* cited by examiner

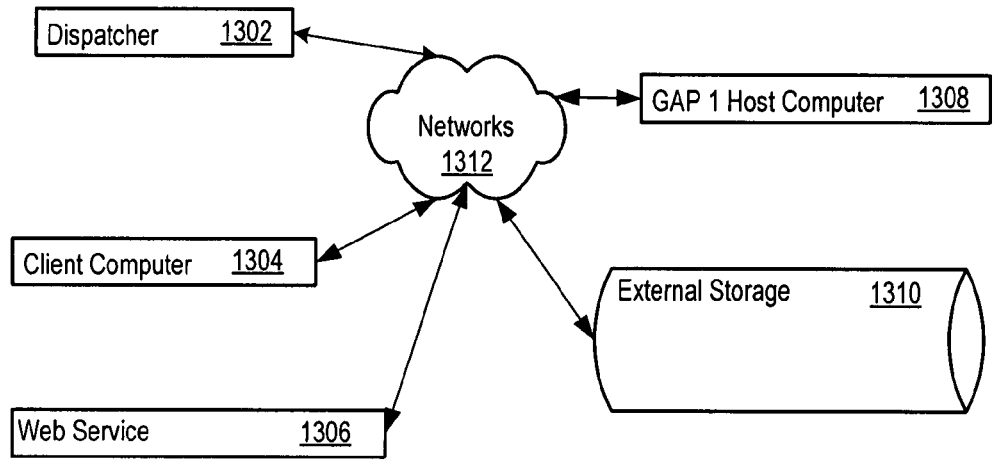
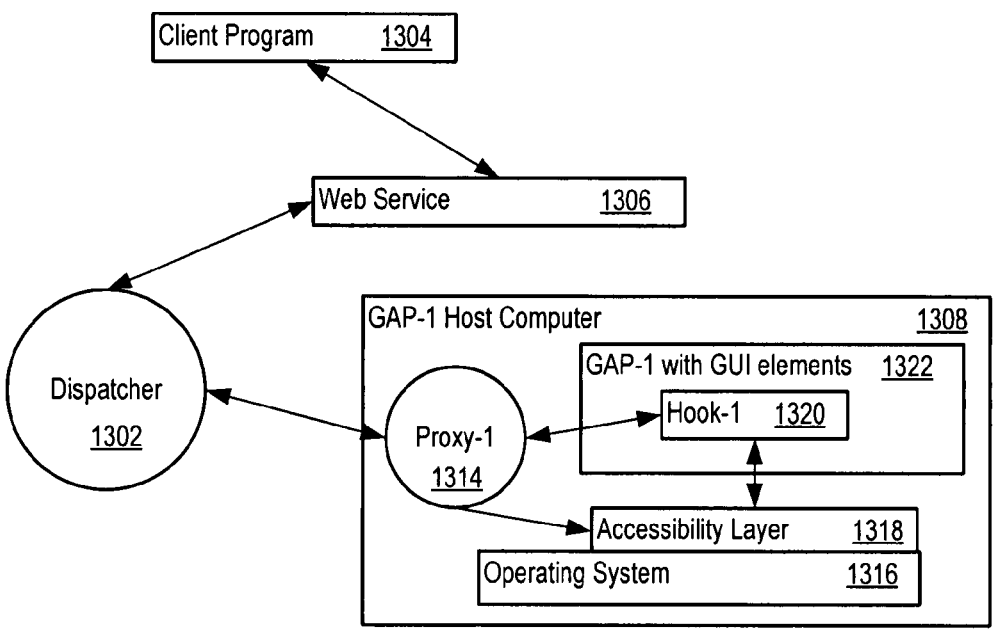
Figure 13

| Structural Representation of a GUI of a GAP and UI Elements of the GAP | 1402 |

| GAP-1 UI Element-1 Label | 1404 |
| GAP-1 UI Element-1 Identifier | 1406 |
| GAP-1 UI Element-1 Location | 1408 |
| GAP-1 UI Element-2 Location | 1410 |
| GAP-1 UI Element-3 Location | 1412 |

| GAP GUI Screen Sequence Representation | 1414 |

| GAP-1 GUI Screen Sequence -1 | 1416 |
| GAP-1 GUI Screen Sequence -2 | 1418 |
| GAP-1 GUI Screen Sequence -3 | 1420 |
| GAP-1 GUI Screen Sequence -4 | 1422 |
| GAP-2 GUI Screen Sequence -1 | 1424 |
| GAP-2 GUI Screen Sequence -2 | 1426 |
| GAP-2 GUI Screen Sequence -3 | 1428 |
| GAP-2 GUI Screen Sequence -4 | 1430 |

| GAP-1 GUI Element-1 Encoded Location Information | 1432 |

Figure 14

AUTOMATIC TEST GENERATION FOR REFERENCE TESTING

BACKGROUND OF THE INVENTION

1. Technical Field

This disclosure concerns generating test cases from graphical user interface applications (GAPs) to perform reference testing on web services. In particular, this disclosure relates to an efficient and non-invasive approach to generating reference tests cases and production data from GAPs for web services.

2. Background Information

Organizations spend a substantial portion of their software development project budgets to create test cases. A strong demand exists for systems that generate accurate test cases, efficiently and economically. However, many software development projects employ laborious and inefficient methods and systems, only to produce inaccurate and incomplete test cases that, as a consequence, fail to meet some or all of the testing requirements. A test case may include test data (e.g., valid input data) and a test oracle (e.g., an expected or valid output). Organizations face many of the same technical issues generating both test data and production data from reference applications, and develop elaborate data conversion programs to create production data for new applications. Software developers and system integrators ("developers") commonly consider test data disposable and only used in testing. Accordingly, test data content may in fact be production data, though distinguished by name due to its role in the testing process.

Developers test new applications to validate that the software complies with system requirements. The testing process includes developing test logic based on detailed specifications, and alternatively, performing reference testing (i.e., a form of regression testing). Developers retest (i.e., regression test) modified software to ensure that a modification to the modified software operates properly, and that the modification has not caused other previously working functions of the modified software to fail. Reference testing includes comparing outputs from new applications against previously recorded (i.e., expected) outputs from the same application or another application. Test oracles may require developers to provide detailed and comprehensive descriptions of the desired behaviour for the new application. Consequently, the quality of a test oracle depends on the quality of the specification. Reference testing includes testing new applications ("target applications") using information from legacy applications ("reference applications"). When developers migrate or model functionality from a reference application to a target application, developers attempt to reuse test data and test cases from the reference application. The purpose of migrating functionality includes replacing the reference application with the target application. In contrast, the purpose of modelling functionality of a reference application may include merely replicating the functionality of the reference application in the target application, and not for the purpose of replacing the reference application.

It is very commonly the case that after a software project team deploys a reference application into production for an organization, neither the organization nor the team preserves test data or testing documentation. Even though organizations may store data accumulated by reference applications over many years of use in production, organizations find it difficult to extract and develop test data and test cases from the reference applications to test target applications. Organizations that desire to use data from reference applications spend significant time and money in attempts to understand the source code and the data structures of the reference applications.

Modern systems often incorporate Graphical User Interface (GUI) Applications (GAPs) implemented in a closed and monolithic manner. Developers building target applications find extracting test cases from existing GAPs (reference applications) a difficult technical challenge, especially for closed and monolithic GAPs. Thus, a fundamental technical problem of interoperability for developers is how to extract test cases from existing GAPs, efficiently and non-invasively.

Developers and organizations purchasing system integration and software development services recognize the difficulty and enormous expense of developing new software applications. Beyond developing new applications, developers must define and generate accurate test data and test cases. Organizations tend to use legacy GAPs as long as possible in business operations, primarily to realize the return on investment for the legacy GAPs. However, developers find extracting data from GAPs difficult, because the vast majority of GAPs are closed and monolithic. In other words, most GAPs do not expose programming interfaces or data in known formats. Thus, while developers find the use of GAPs to extract test data and test cases desirable, often the original implementation of a GAP makes the extraction impossible.

In contrast to GAPs, developers design web services as software components that flexibly exchange information over networks, including the Internet. Consequently, business industry demand for applications that easily and inexpensively exchange information has partly caused widespread acceptance of web services. Employing web services, unlike GAPs, enables organizations to quickly build integrated systems by composing (i.e., configuring) the web services for information exchange. Organizations easily migrate and/or model functionality from existing web services to other web services. However, migrating or modelling functionality in GAPs to generate test data and test cases for web services provide a considerable technical challenge for organizations and developers.

Organizations have invested heavily in legacy GAPs and developers find it difficult and time consuming to analyze the source code of GAPs to extract data and test cases, because of brittle legacy architectures, poor documentation, significant programming effort, and subsequently, the large cost of such projects. Organizations often do not have access to the source code necessary to analyze and develop data extraction and test cases from GAPs, in particular regarding third-party provided GAPs. Given the complexity of GAPs and the cost to migrate and model GAPs to create new web services, a fundamental problem exists of how to extract test data and test cases from GAPs to test web services, and generate production data from GAPs, efficiently and non-invasively.

A need has long existed for a system and method to economically and efficiently extract test cases and production data from GAPs for web services.

SUMMARY

A system for application reference testing (SMART) considers GAPs as state machines, in which a structural representation of GUIs of a GAP and GUI elements of the GAP define a GAP state (i.e., GAP state definition) useable to test applications. SMART provides a general, reusable, and reliable mechanism for generating test data and test cases from legacy applications without the need to understand, manipulate, or modify the legacy application source code or data storages. When developers write target applications, the reference applications serve as references to test the target applications. Reference applications may include legacy applications that the target application will replace (i.e., migrate functionality), or non-legacy applications (i.e., applications that the target application will not replace) that possess functionality the target application intends to model. Developers may also use SMART to generate test cases and production data from the reference applications to test and operate the target applications. Organizations face many of the same technical issues generating both test data and production data from reference applications, and often spend significant time, money, and other resources to develop elaborate data conversion programs to create production data, as well as test data, for new applications. One distinction between test data and production data is that test data is generally considered disposable. Accordingly, SMART also solves the technical problem of creating production data for target applications from reference applications.

In one implementation, SMART considers GAPs as state machines, in which a structural representation of GUIs of a GAP and GUI elements of the GAP define a GAP state or GAP state definition. The GAP state definition may include: UI screen sequences, GUI elements of the GAP, the function types of the GUI elements; the properties of the GUI elements, and the values of the GUI elements. SMART may establish test cases based on GUI elements that can substitute for target application data, and GAP state definitions. SMART may establish the test cases to include test logic incorporated with GAP state definitions. SMART allows developers to test target applications (e.g., web services based applications), using GAPs as reference applications. In addition, SMART may calculate or analyze the number of GUI elements that SMART may substitute for target application data and the number of data elements employed by the GAP, including non-GUI elements, to determine the suitability of a GAP as a reference application for testing a target application. SMART may indicate the percentage of target application data parameters that SMART may substitute using GAP GUI elements as test data.

SMART may work in conjunction with a Composer of Integrated Systems (Coins) to produce test cases and production data. Coins provides an approach for creating integrated systems composing GAPs and web services. SMART may work with Coins to control a first GAP (e.g., invoice application) to produce an input to a second GAP (e.g., an expense application) to produce a test case. Coins combines a nonstandard use of accessibility technologies used to access and control GAPs in a uniform way with a visualization mechanism that enable nonprogrammers to compose GAPs with each other and web services. Coins uses accessibility technologies to control GAPs and their user interface (UI) elements as programming objects, set and retrieve UI elements, and associates methods with actions that users perform on the UI elements. For example, when a user selects a combo box item the combo box invokes a method that performs some computation. A web service would invoke methods, and set or retrieve field values of a programming object representing the combo box to control the combo box programmatically. Coins controls GAPs as programming objects, and UI elements as fields of the programming objects, and invokes methods on the objects to perform actions and manipulate the GAPs and UI elements. Unfortunately, web services cannot access and manipulate UI elements as pure programming objects, because UI elements only support user-level interactions. However, accessibility technologies expose a special interface that allows the Coins to invoke methods, and set and retrieve UI element values, and thereby control UI elements and GAPs.

Organizations may extend the value of legacy GAPs by using the legacy GAPs to test web services. SMART allows users to associate GUI elements, GAP state definitions, and test logic with test cases that establish test frameworks. SMART establishes test frameworks by capturing user interactions with GAP GUI element (e.g., clicking a button on a GAP screen). SMART allows users to define the GUI elements to use as test data elements, and the GAP state definitions and test logic to define test oracles. In addition, SMART allows users to specify how to use test oracle return values to validate test results.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 13 shows a web service creation tool.

FIG. 14 shows a structural representation of a GUI of a GAP and UI elements of the GAP.

DETAILED DESCRIPTION

Figure 1:
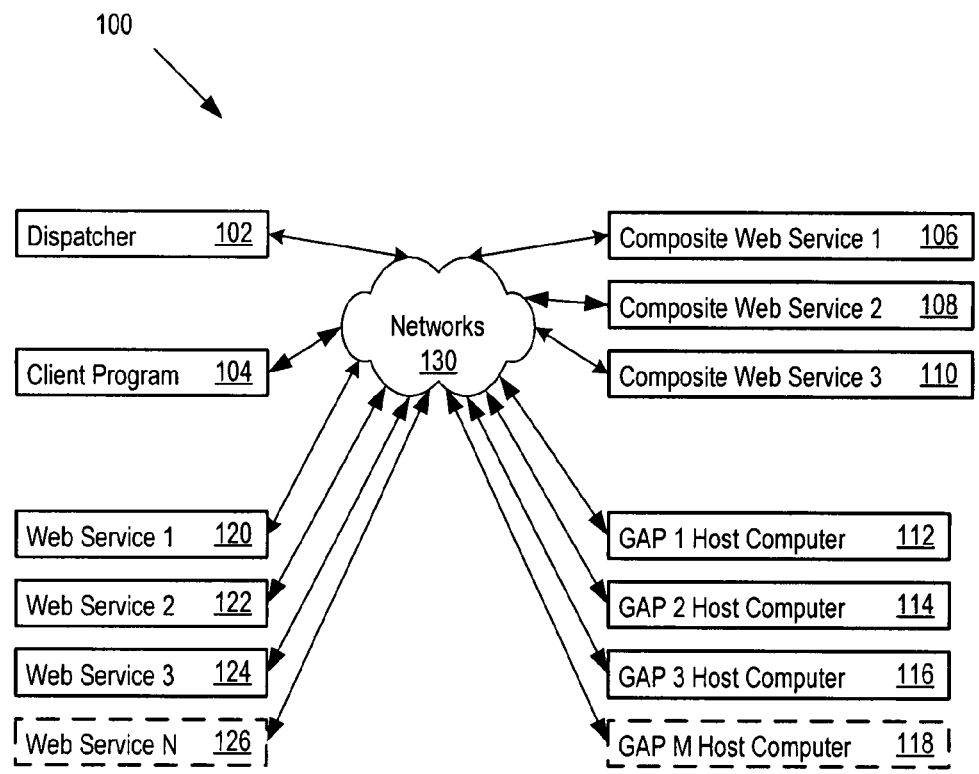
FIG. 1 illustrates an integrated system composing GUI-Based Applications and web services.

A system for application reference testing (SMART) considers GAPs as state machines, in which a structural representation of GUIs of a GAP and GUI elements of the GAP define a GAP state (i.e., GAP state definition) useable to test applications. SMART solves the technical problem of generating test data and test cases from GAPs to test applications. SMART interacts with an accessibility layer to define user interactions with GAPs, by performing point-and-click, drag-and-drop operations on the GAPs, and generate reusable test data and test cases for target applications. SMART considers GAPs as state machines, in which a structural representation of GUIs of a GAP and GUI elements of the GAP define a GAP state or GAP state definition. The GAP state definition may include: UI screen sequences; GUI elements of the GAP; the function types of the GUI elements; the properties of the GUI elements; and the values of the GUI elements. SMART extends certain aspects of Coins, briefly discussed below.

Accessibility technologies provide different aids to disabled computer users, including, as examples: screen readers for the visually impaired; visual indicators or captions for users with hearing loss; and software to compensate for motion disabilities. Under 36 CFR part 1194, the Architectural and Transportation Barriers Compliance Board's Electronic and Information accessibility Standards requires that when Federal agencies develop, procure, maintain, or use electronic and information technology, the electronic and information technology allows Federal employees with disabilities access and use of information and data comparable to Federal employees without disabilities. Accordingly, because the Federal Government's large appetite for technology, and the desire of the technology industry to sell technology to the Federal Government, most computing platforms include accessibility technologies. For example, Microsoft designed Microsoft's Active Accessibility (MSAA) technology to improve the way accessibility aids work with applications running on Windows, and Sun Microsystems accessibility technology assists disabled users who run software on top of Java Virtual Machine (JVM). Many computing platforms, as well as libraries and applications incorporate accessibility technologies in order to expose information about user interface elements. Accessibility technologies provide a wealth of sophisticated services useable to retrieve UI elements attributes, set and retrieve UI element values, and generate and intercept different events. SMART uses accessibility technology to access an accessibility interface that UI elements expose. The accessibility interface exports method for accessing and manipulating the properties and behaviour of the UI elements. For example, a Windows UI element employs the IAccessible interface to allow access and control of the UI element using the MSAA API calls. Accessibility API calls may include: get into object; perform action on object; get value from object; set value on object; navigate to object; and set property on object.

SMART generates a test framework for a target application (TAP) from a GAP that serves as the reference application. SMART interacts with the GAP through an accessibility layer to capture a structural representation of a GAP graphical user interface (GUI) screen including a GUI element. SMART also establishes a GAP state definition. The GAP state definition includes a function type for the GUI element, an element property for the GUI element, and an element value for the GUI element. SMART generates the test framework, including a test case specifying an interaction with the GAP through the accessibility layer based on the structural representation. The test framework also includes a test data element that provides an input parameter for the interaction of the test case with the GAP.

Coins addresses the technical challenge of enabling GAPs to exchange information (i.e., interoperate) with each other and web services over the Internet, and solves the technical problem of composing integrated systems using GAPs and web services, efficiently and non-invasively. Coins allows users to create composite web services from multiple GAPs and web services. Coins identifies and registers multiple GAPs, as a result of the Coins capturing, through the accessibility layer (i.e., accessibility API), information regarding GAPs and user interface (UI) elements of the GAPs. Coins registers GAPs and web services using a design tool user interface to capture user interface interaction specifications that create user interface element correspondence between a UI element of one GAP and a different UI element in a different GAP. Coins defines a web service parameter relationship between a web service parameter and one or more UI elements of a GAP, and defines a composite web service definition for a composite web service from one or more web service parameters. Coins generates and deploys composite web services based on composite web service definitions, one or more user interface interaction specifications, and one or more web service parameter relationships. Coins may also generate and deploy web services based on web service definitions that include one or more user interface interaction specifications between UI elements of different GAPs, and one or more web service parameter relationships.

Coins uses proxies to command and control GAPs and UI elements of GAPs to fulfil web service requests. When a proxy receives a response from a GAP, the proxy extracts data from the GAP, and forwards the extracted data to one or more web services. Proxies use hooks to perform various actions on UI elements and GAPs programmatically through accessibility API calls. Accessibility technologies allow hooks to register for different events produced by UI elements and GAPs monitored by accessibility APIs. One or more GAPs may run with a proxy and corresponding hooks on a single designated GAP host computer along with a accessibility API.

Coins uses a dispatcher as a central point for coordinating proxies in a distributed environment. A proxy registers with the dispatcher under a unique name, collects GAP identification data and information about GAPs running with the proxy on a GAP host computer, and sends the collected GAP identification and information about GAPs to the dispatcher. The dispatcher uses the information collected from the proxies to route web service requests to proxies. The dispatcher routes web service request components of composite web services to one or more GAP host computers, where corresponding proxies ultimately command and control GAPs and UI elements. The dispatcher acts as an intermediary that enables web services and GAPs to run on separate computers while presenting a common view to client programs. Because organizations may move web services and GAPs around the enterprise computing environment for various reasons (e.g., to improve business processes efficiencies or the performance of applications) the dispatcher provides web services and GAPs migration and location transparency to client programs.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations may be depicted as being stored in memories, all or part of systems and methods consistent with Coins may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although this document describes specific components of Coins and SMART, methods, systems, and articles of manufacture consistent with SMART and Coins may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors, and may be implemented or distributed as shared libraries, application programming interfaces (APIs), or in other forms. Furthermore, the programs, or any portion of the programs, may instead be implemented in hardware.

FIG. 1 illustrates an example of an integrated system 100 that includes composed GUI-Based applications and web services. In the example shown in FIG. 1, the integrated system 100 includes the following components: a dispatcher 102; a client program 104; composite web services 106, 108, and 110; GAP host computers 112, 114, and 116; and web services 120, 122, 124, and 126. The integrated system 100 components may communicate through a Network 130 such as the Internet. The integrated system 100 uses the dispatcher 102 to coordinate communication between GAPs, web services, and composite web services. When a client program 104 invokes a web service method managed by a web service 120-126 or composite web service 106-110, the designated web service sends one or more requests to the dispatcher 102, which routes the requests to the appropriate GAP host computers 112, 114, 116 and 118. The GAPs running on their respective GAP host computers 112, 114, 116, and 118 complete the requests and return responses to the dispatcher 102. The dispatcher 102 forwards the responses to the appropriate web services (e.g., web services 120-126 or composite web services 106-110), which send responses to the client program 104. Prior to composing the Integrated System 100 using the GAPs and web services, each business process operation that the client program 104 invoked required agents to interact with the one or more GAPs separately, because of a lack of interoperability between the one or more GAPs.

Figure 2:
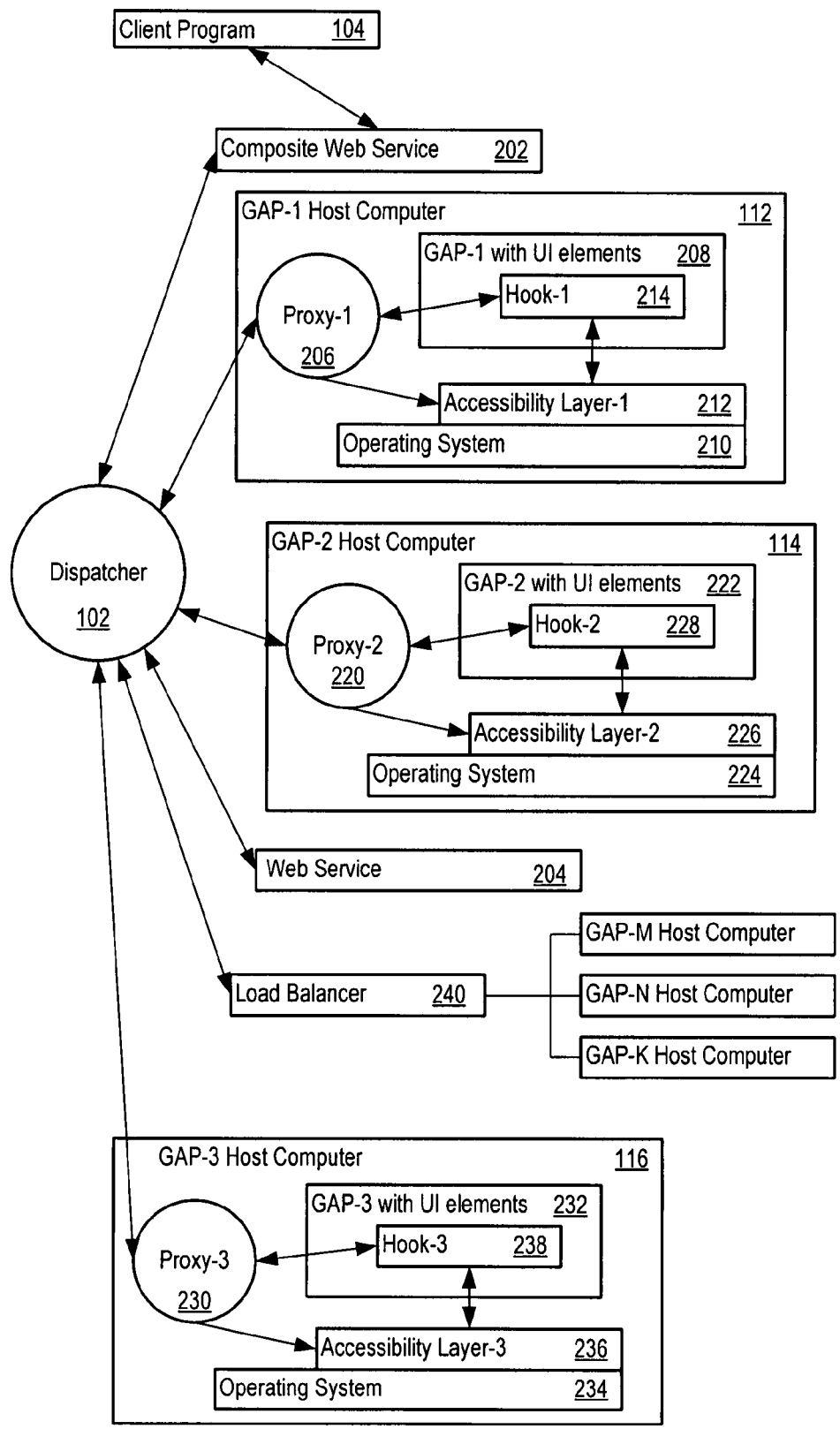
FIG. 2 shows a dispatcher coordinating communication between GAPs and web services.

FIG. 2 shows a dispatcher 102 coordinating communication between GAPs and web services. The dispatcher 102 acts as an intermediary that enables web services and GAPs to run on separate computers while presenting a common view to client programs 104. Because organizations may move web services and GAPs around the enterprise computing environment for various reasons (e.g., to improve business processes efficiencies or the performance of applications) the dispatcher 102 provides web services and GAPs migration and location transparency to client programs 104. In one implementation of Coins, when a client program 104 invokes a web service method corresponding to a composite web service 202, the composite web service 202 sends one or more web service request components to dispatchers, such as the dispatcher 102. A composite web service may include multiple request components (e.g., methods that need to be invoked to implement full control over multiple GAPs). The dispatcher 102 determines to which proxies (e.g., proxy-1 206, proxy-2 220 and proxy-3 230) to route the web service request components, based on information collected from the proxies. A proxy registers with the dispatcher 102 under a unique name, collects GAP identification data and information about the GAPs running on the GAP host computer (e.g., GAP-1 host computer 112, GAP-2 host computer 114, and GAP-3 host computer 116) with the proxy, and sends the GAP identification data and information to the dispatcher 102.

In one implementation, when proxy-1 206 receives a web service request component the proxy-1 206 interacts with one or more UI elements of the GAP-1 with UI elements 208 through the hook-1 214, in response to the web service request component. The accessibility layer-1 212 may support hook-1 214 to perform various actions on GAP-1 with UI elements 208 programmatically. Proxy-2 220 in communication with GAP-2 host computer 114 for GAP-2 with UI elements 222 and hook-2 228 may register the GAP-2 with UI elements 222 with the dispatcher 102, resulting in a second composite web service request component of the composite web service to route through the dispatcher 102 to the GAP-2 host computer 114. In one implementation, when proxy-2 220 receives the second web service request component the proxy-2 220 interacts with one or more of the UI elements of the GAP-2 with UI elements 222 through the hook-2 228, in response to the second web service request component. The accessibility layer-2 226 may support hook-2 228 to perform various actions on GAP-2 with UI elements 222 programmatically. The dispatcher 102 may use a load balancer 240 to route web service requests to multiple GAP host computers.

In one implementation of the Integrated System 100 multiple instances of a GAP (e.g., Acme Expense GAP (AEG)) run concurrently on separate GAP host computers (e.g., GAP-1 host computer 112, GAP-2 host computer 114, and GAP-3 host computer 116). The dispatcher 102 assigns each instance of AEG a unique GAP identifier, enabling the dispatcher 102 to coordinate parallel execution of multiple instances of AEG, so that when the composite web service 202 sends a composite web service request component to the dispatcher 102 in response to a request from a client program 104 the dispatcher 102 routes the composite web service request component to the correct instance of AEG.

Figure 3:
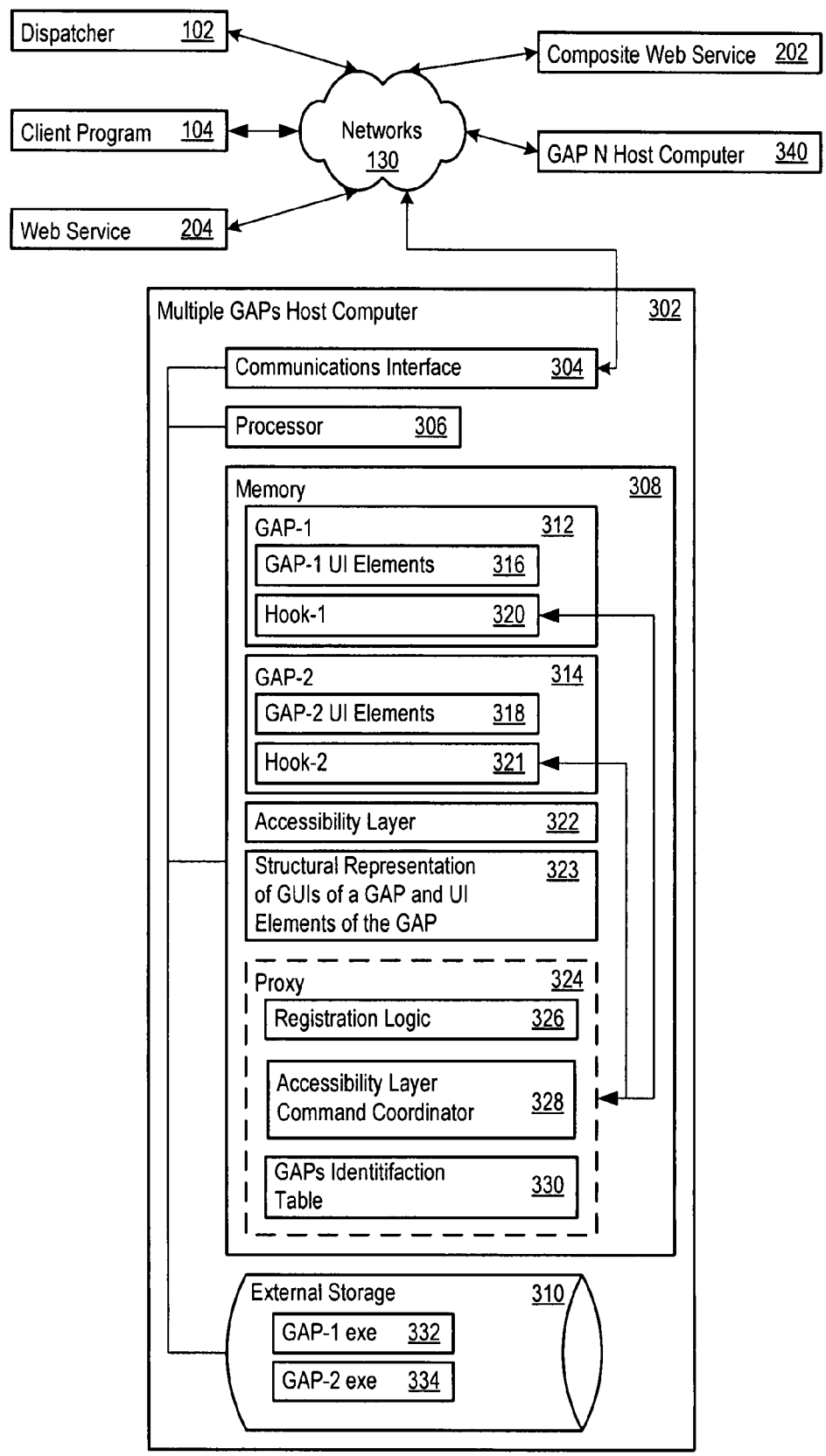
FIG. 3 illustrates a GAP host computer concurrently running two GAPs.

FIG. 3 illustrates a GAP host computer 302 concurrently running two GAPs. In one implementation, a single GAP host computer may run multiple GAPs, and include, in addition to a communications interface 304 to communicate with various components of an Integrated System 100, a processor 306, memory 308, and external storage 310. The memory 308 may include: instances of different GAPs running (e.g., GAP-1 312, and GAP-2 314); GAP-1 UI elements and GAP-2 UI elements corresponding to GAP-1 312 and GAP-2 314, respectively; a hook-1 320 and hook-2 321; accessibility layer 322; a structural representation of GUIs of a GAP and UI element of the GAP 323; and a proxy 324. In one implementation GAP-1 312 may represent an instance of a third-party closed and monolithic Windows GAP (e.g., an Acme Expense GAP (AEG)) that a company uses internally to keep track of purchases, and GAP-2 314 may represent a closed and monolithic GAP named My Invoices and Estimates (MIE) that the company uses to create invoices for ordered goods.

In one implementation, the accessibility layer 322 supports hook-1 320 and hook-2 to perform various actions programmatically on GAP-1 312, GAP-1 UI elements 316, and GAP-2 314 and GAP-2 UI elements 318, respectively. The accessibility layer 322 may also assist with capturing a structural representation of GUIs of a GAP and UI elements of the GAP 323, as a result of interactions with the GAP. The structural representation of GUIs of a GAP and UI elements of the GAP 323 may provide the proxy 324, hook-1 320 and hook-2 321 comprehensive information to locate, control, and manipulate GAP-1 312, GAP-2 314, GAP-1 UI elements 316, and GAP-2 UI elements 318. The structural representation of GUIs of a GAP and UI elements of the GAP 323 may be implemented with a data structure (e.g., an XML file) that captures a depth first traversal of the GUI, breadth first traversal of the GUI, or that otherwise stores the interface elements and screen sequences of the GUI. The proxy 324 may analyze the structural representation of GUIs of a GAP and UI elements of the GAP 323 to locate a GAP UI element in the GAP GUI.

The proxy 324 may include registration logic 326, an accessibility layer command coordinator 328, and a GAPs identification table 330. The proxy 324 may use the registration logic 326 to register GAP-1 312 and GAP-2 314 with the dispatcher. The accessibility layer command coordinator 328 may control GAP-1 312 and GAP-1 UI elements 316 through hook-1 320, in response to a web service request component. To that end, the accessibility layer command coordinator 328 may receive web service request components, extract the graphical user interface element identifiers, a structural representation of a GAP, and the requested action on the identified graphical user interface element. The accessibility layer command coordinator 328 may then traverse the structural representation 323 to determine where the identified graphical user interface element resides in the GAP user interface, and make calls to the hook to navigate the GAP to the interface that includes the identified graphical user interface element. Once at the appropriate interface, the accessibility layer command coordinator 328 may then exercise the graphical user interface element through the hook to perform the requested action.

In another implementation, proxy-1 206 uses an accessibility layer command coordinator running on and dedicated to GAP-1 host computer 112 to control GAP-1 with UI elements 208 through hook-1 214, in response to a web service request component. The proxy 324 may collect GAP identification data and information about GAPs (e.g., GAP-1 312, and GAP-2 314) hosted with proxy 324 on the multiple GAPs host computer 302, and stores the collected GAP identification data and information about the GAPs in the GAPs identification table 330. In one implementation, the proxy 324 may store GAP Identifiers for multiple locally hosted GAPs (e.g., GAP-1 312, and GAP-2 314) in the GAP identification table 330. The proxy 324 may periodically send the collected GAP identification data and information about the GAPs to the dispatcher 102. The multiple GAPs host computer 302 may use the external storage 310 to store the GAP-1 exe 332 and GAP-2 exe 334 programs.

In an alternative implementation, the dispatcher 102 receives a web service request message from the web service 204 that includes a GAP UI element Identifier and an action request identifier for a specific GAP UI element (e.g., GAP-1 UI elements 316). The GAP UI element may correspond to a GAP (e.g., GAP-1 312) executing in memory 308. The dispatcher 102 may send the web service request message to proxy 324, which extracts the GAP UI element identifier and action request identifier from the web service request message. The proxy 324 may perform an action against the GAP-1 UI elements 316 specified in the action request identifier through hook-1 320. The action request identifier may include a GUI element data setting action, or a GUI element data retrieval action that the proxy performs through hook-1 320 against the GAP-1 UI elements 316 specified in the action request identifier.

Figure 4:
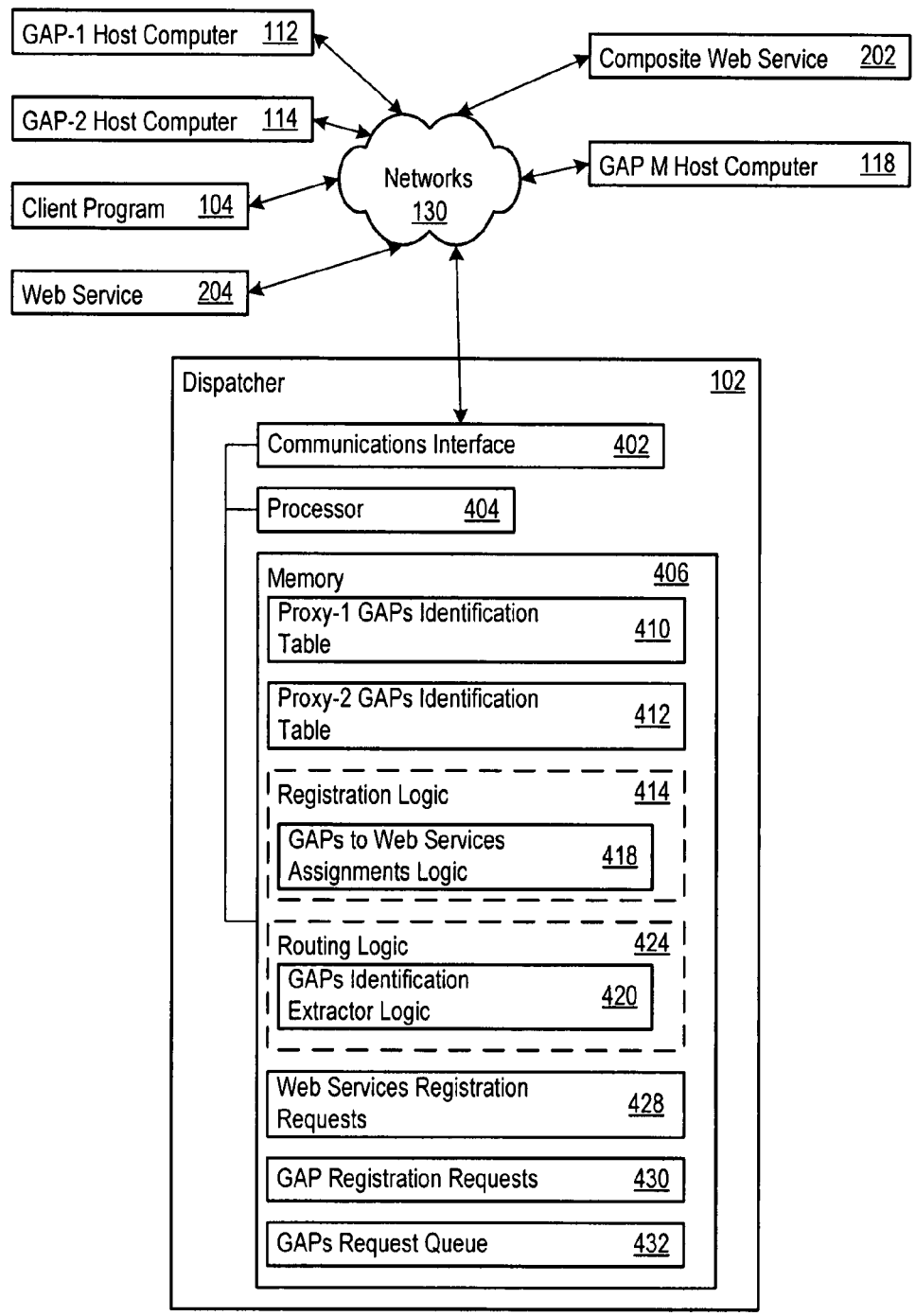
FIG. 4 shows a dispatcher and dispatcher components.

FIG. 4 shows a dispatcher 102 and dispatcher components. The dispatcher 102 may include a communications interface 402, a processor 404, and memory 406. The dispatcher 102 memory 406 may include: a proxy-1 GAPs identification table 410; a proxy-2 GAPs identification table 412; Registration logic 414; Routing logic 424; web services registration requests 428; GAP registration requests 430; and a GAPs request queue 432. Coins uses the dispatcher 102 as a central point for coordinating proxies (e.g., proxy-1 206 and proxy-2 220) in a distributed environment. A proxy (e.g., proxy-1 206 and proxy-2 220) may register with the dispatcher 102 under a unique name, and periodically collect GAP identification data and information about GAPs running with the proxy on the GAP Host computers (e.g., GAP-1 host computer 112, and GAP-2 host computer 114), and send the collected GAP identification data and information about GAPs to the dispatcher 102. The dispatcher 102 may store the collected information from each proxy in separate proxy GAPs identification tables (e.g., proxy-1 GAPs identification table 410, and proxy-2 GAPs identification table 412). The proxy GAPs identification tables may contain GAP identification data and information for multiple GAPs. For example, as shown in FIG. 3, the proxy 324 may periodically send the dispatcher 102 the GAPs identification table 330, which may include GAP identification data and information for GAP-1 312 and GAP-2 314.

In one implementation, when a client program 104 invokes a method of a web service 204 or composite web service 202, the web service 204 or composite web service 202 to which the method belongs sends a web services registration request 428 to the dispatcher 102. The dispatcher 102 may identify the GAPs required to fulfil a method of a web service 204, or a composite web service 202. The dispatcher 102 may use registration logic 414 to receive GAP registration requests 430 from GAPs and web services registration requests 428 from web services 204, and composite web services 202. The dispatcher 102 may also use the registration logic 414 to control GAPs to web services assignments logic 418 to analyze the proxy GAPs identification tables to assign GAPs and UI elements to methods of web services 204, and methods of composite web services 202. In one implementation, the registration logic 414 instantiates the proxy GAPs identification table (e.g., proxy-1 GAPs identification table 410, and proxy-2 GAPs identification table 412) in response to a GAP registration request 430 from a GAP. The dispatcher 102 may include a GAPs request queue 432 to store web service requests and web service request components when a web service requests an unavailable GAP, which will be explained in further detail below.

Figure 5:
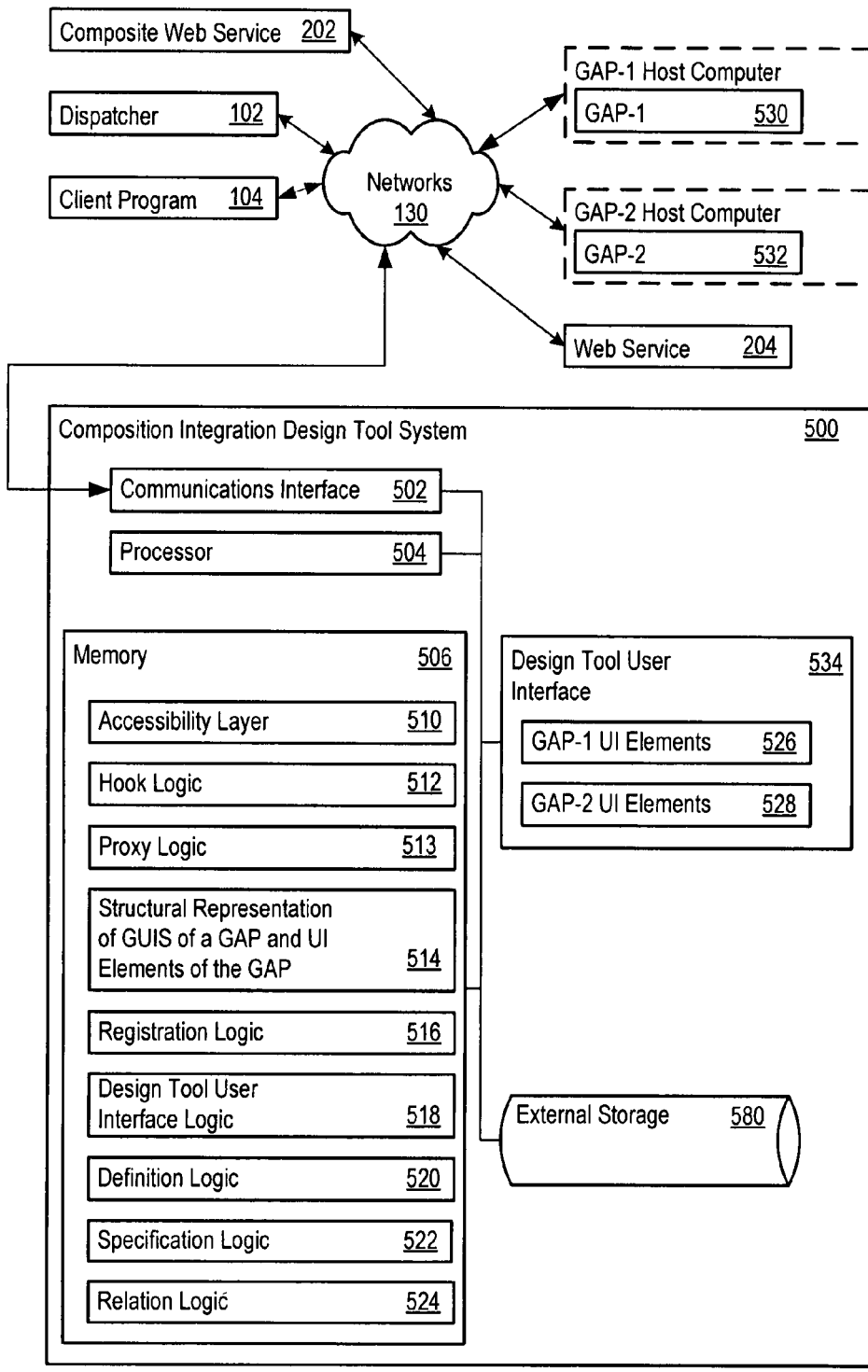
FIG. 5 shows a composition integration design tool system.

FIG. 5 shows a composition integration design tool system 500. The composition integration design tool system 500 may include a communications interface 502, a processor 504, and memory 506. The composition integration design tool system 500 memory 506 may include: interaction logic 508; accessibility layer 510; hook logic 512; proxy logic 513; a structural representation of GUIs of a GAP and UI elements of the GAP 514; registration logic 516; design tool user interface logic 518; definition logic 520; specification logic 522; and relation logic 524.

The interaction logic 508 captures one or more GAP-1 UI elements 526, and one or more GAP-2 UI elements 528 using the accessibility layer 510. In other words, the Interaction logic 508 may capture a structural representation of GUIs of a GAP and UI elements of the GAP 514 through the accessibility layer 510 using the hook logic 512 to communicate with the GAPs (e.g., GAP-1 530, GAP-2 532, and corresponding GAP-1 UI elements 526 and GAP-2 UI elements 528). Proxy logic 513 may control the GAPs through the hook logic 512, and the proxy logic 513 may use the registration logic 516 to send GAP registration requests 430 to the dispatcher 102. The structural representation of GUIs of a GAP and UI elements of the GAP 514 may include a GAP UI element label, a UI element Identifier, and location information in the GAP GUI for the GAP UI elements (e.g., GAP-1 UI elements 526 and GAP-2 UI elements 528), and may also include a GAP GUI screen sequence representation for each GAP GUI screen sequence.

Figure 6:
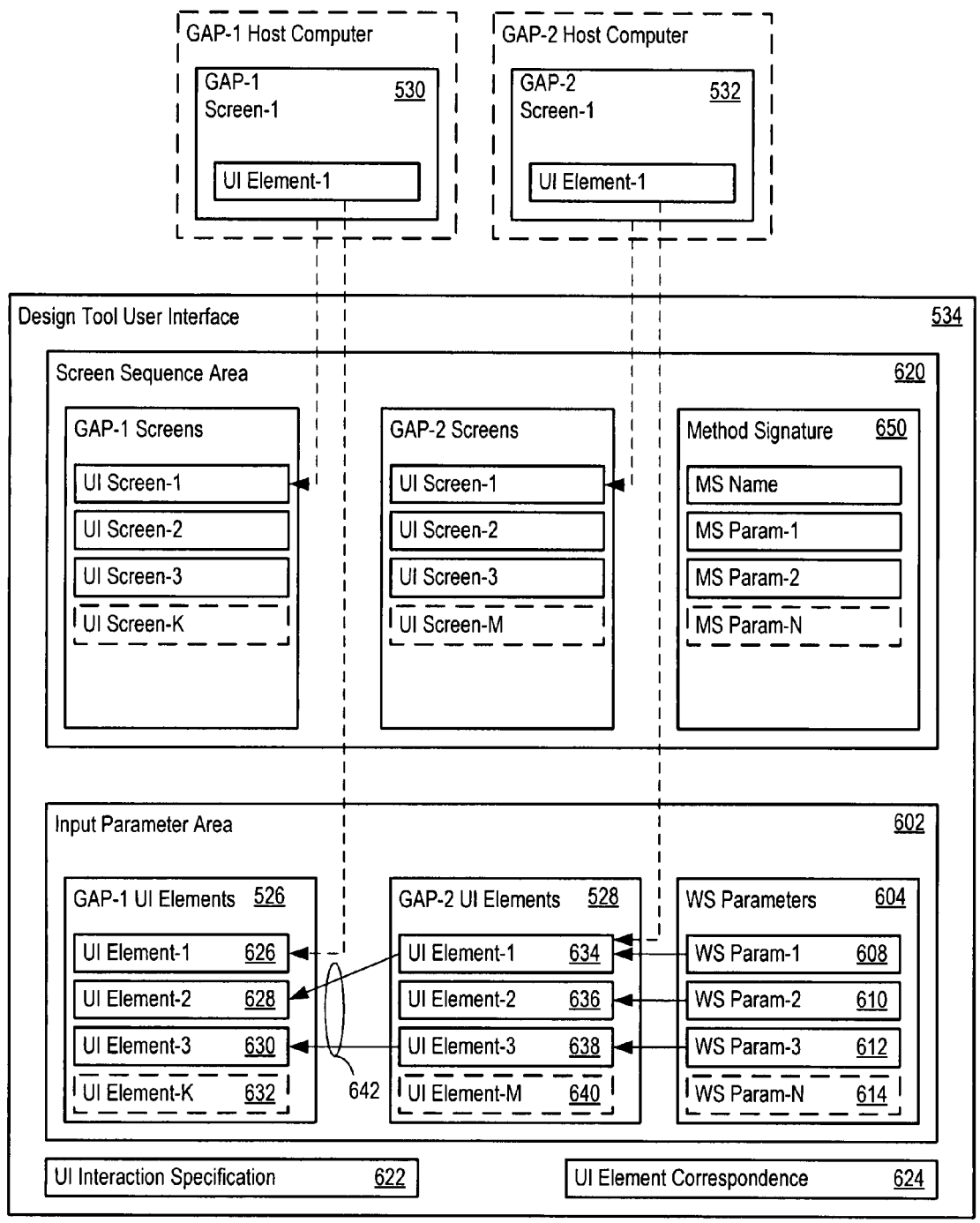
FIG. 6 shows a design tool user interface.

FIG. 6 shows one example implementation of a design tool user interface 518. The design tool user interface logic 518 may generate a design tool user interface 534 that includes an input parameter area 602 and a screen sequence area 620. The design tool user interface logic 518 provides additional, fewer, or different interface elements. The design tool user interface logic 518 may include a point-and-click interface, drag-and-drop interface or both a point-and-click interface, drag-and-drop interface between GAP UI elements (e.g., GAP-1 UI elements 526 and GAP-2 UI elements 528) and the input parameter area 602, and determine operator selections (i.e., UI interactions) of GAP UI elements, as well as web service parameters 604 (e.g., WS parameter-1 608, WS parameter-2 610, and WS parameter-3 612). The design tool user interface 534 may use the drag-and-drop interface to move GAP UI elements (e.g., GAP-1 UI elements 526 and GAP-2 UI elements 528) and web service parameters 604 into the input parameter area 602, and the GAP GUI screen sequences into the screen sequence area 620 to establish a user interface interaction specification 622 that creates a UI element correspondence 624 between at least one of the GAP-1 UI elements 526 (e.g., GAP-1 UI element-1 626, GAP-1 UI element-2 628, and GAP-1 UI element-3 630) and at least one of the GAP-2 UI elements 528 (e.g., GAP-2 UI element-1 634, GAP-2 UI element-2 636, and GAP-2 UI element-3 638). For example, FIG. 6 shows an arrow 642 drawn (e.g., by an operator or from input from an automated analysis tool) from GAP-2 UI element-1 634 to GAP-1 UI element-2 628, which establishes a UI element correspondence 624 between the two GAP UI elements. The design tool user interface 534 may include a method signature 650 that defines the name of a web service method, the parameters, and the method type. The method signature 650 may also specify error or exception handling procedures and the parameter types of each method parameter.

Figure 7:
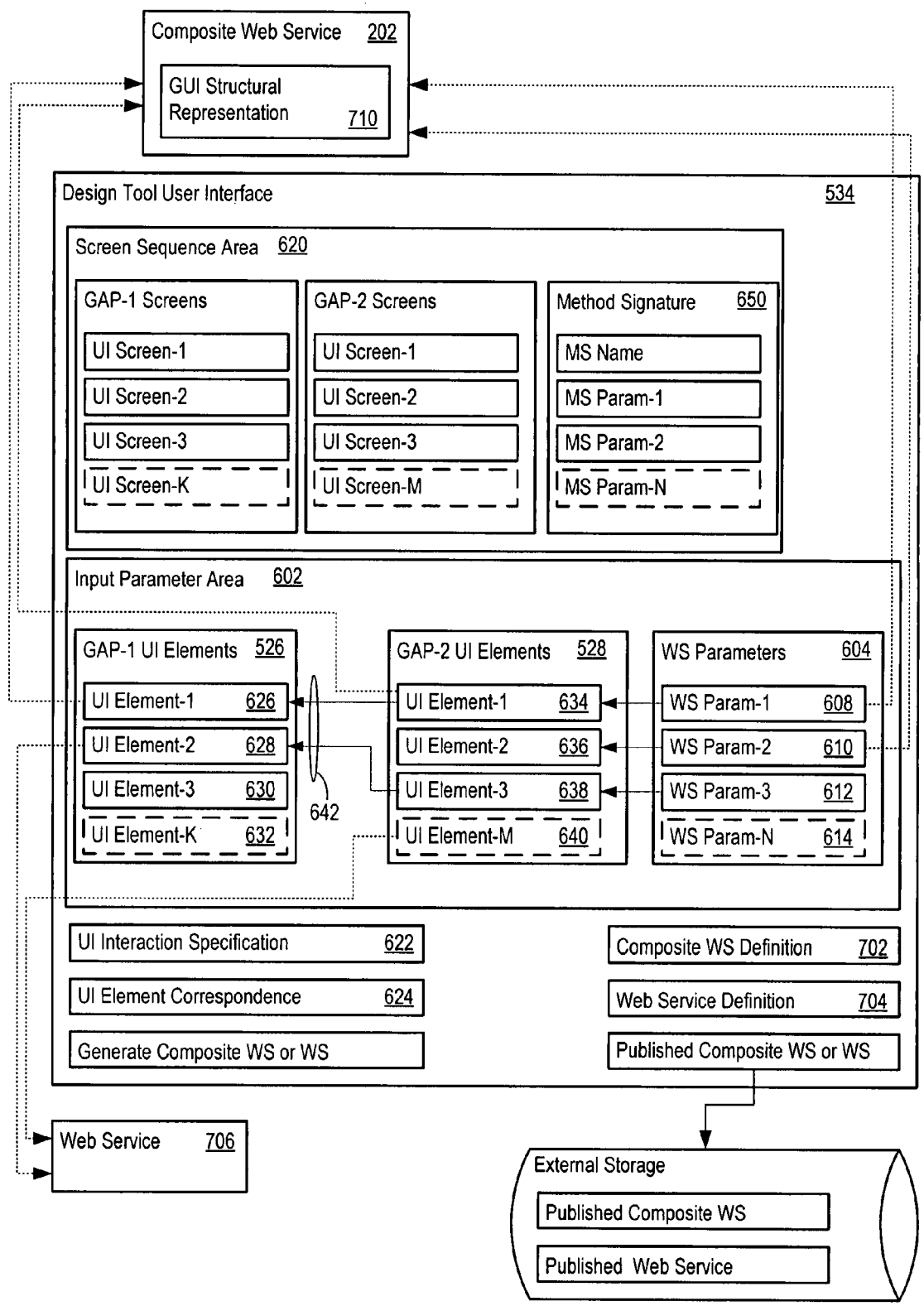
FIG. 7 shows a design tool user interface and composite web service.

FIG. 7 shows a design tool user interface and composite web service. The design tool user interface 534 may use the definition logic 520 to establish a composite web service definition 702. Thus, the definition logic 520 may establish the composite web service definition 702 for a composite web service 202, including one or more web service parameters 604 (e.g., WS parameter-1 608, WS parameter-2 610, and WS parameter-3 612), a web service name, or other web service parameters. The design tool user interface 534 may generate the composite web service 202, and publish the composite web service 202. The design tool user interface 534 may use the definition logic 520 to establish a web service definition 704 for a web service 706, based on the structural representation of GUIs of a GAP and UI elements of the GAP 514 using the accessibility layer 510. The design tool user interface 534 may use the specification logic 522 to establish the user interface interaction specifications 622. For example, the specification logic 522 may create the UI element correspondence 624 between at least one of the GAP-1 UI elements 526 (e.g., GAP-1 UI element-1 626, GAP-1 UI element-2 628, and GAP-1 UI element-3 630) and at least one of the GAP-2 UI elements 528 (e.g., GAP-2 UI element-1 634, GAP-2 UI element-2 636, and GAP-2 UI element-3 638). For example, the user interface interaction specification 622 may create a UI element correspondence 624 between the GAP-2 UI element-1 634 and the GAP-1 UI element-2 628 that defines an exchange of an invoice amount from the GAP-2 UI element-1 634 (e.g., an invoice field amount in the MIE GAP) to an expense amount in the GAP-1 UI element-2 628 (e.g., an expense field amount in the AEG). The specification logic 522 may establish the user interface interaction specification 622 from multiple GAP-1 UI elements 526 (e.g., GAP-1 UI element-1 626, GAP-1 UI element-2 628, and GAP-1 UI element-3 630), to multiple GAP-2 UI elements 528 (e.g., GAP-2 UI element-1 634, GAP-2 UI element-2 636, and GAP-2 UI element-3 638).

Figure 8:
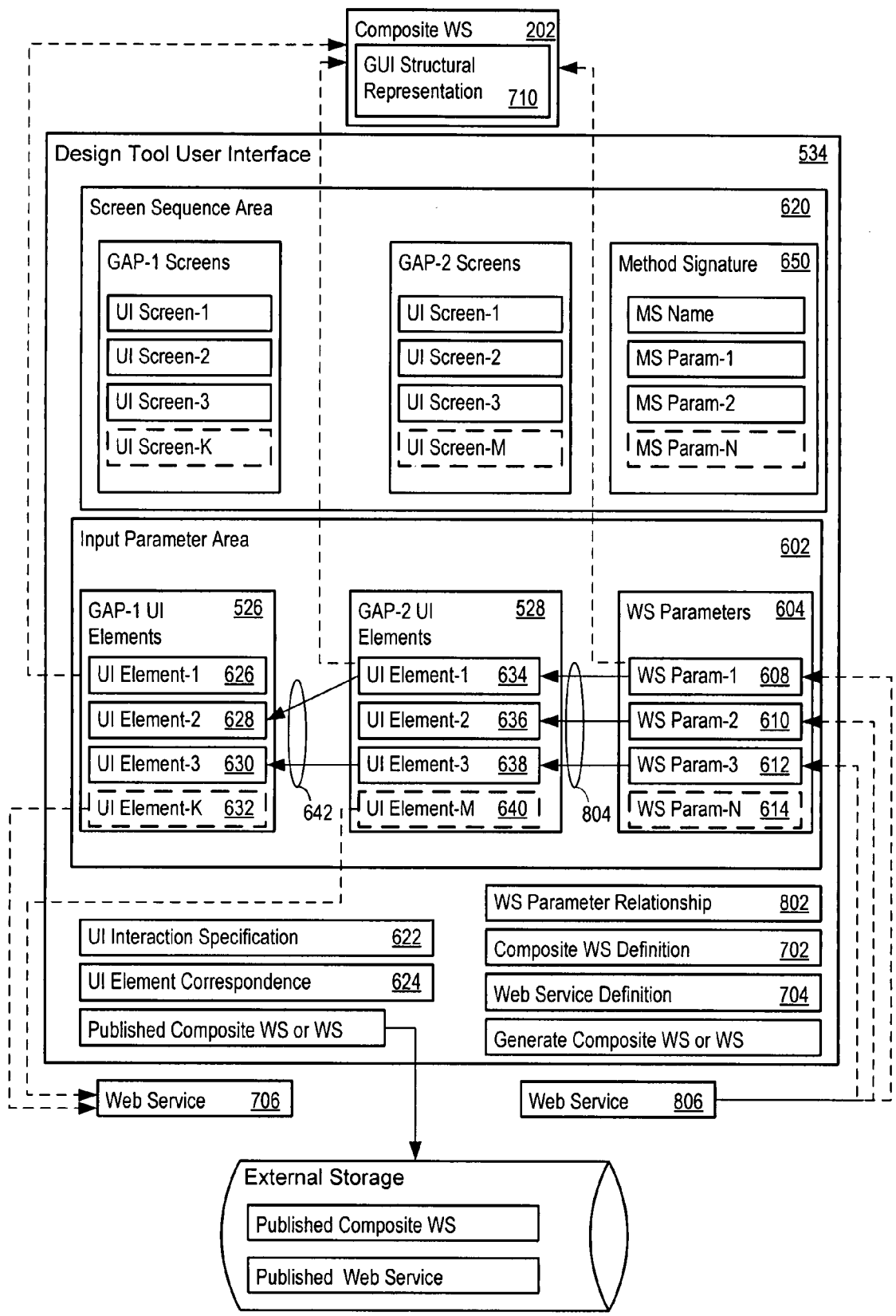
FIG. 8 shows a design tool user interface and web service parameter relationship.

FIG. 8 shows a design tool user interface and web service parameter relationship. The relation logic 524 may establish a web service parameter relationship 802 between at least one of the web service parameters 604 (e.g., WS parameter-1 608, WS parameter-2 610, and WS parameter-3 612), and at least one of the GAP-2 UI elements 528 (e.g., GAP-2 UI element-1 556, GAP-2 UI element-2 558, and GAP-2 UI element-3 560). For example, FIG. 8 shows arrows 804 drawn (e.g., by an operator or from input from an automated analysis tool) from WS parameter-3 612 to GAP-2 UI element-3 638, that establish a web service parameter relationship 802 between a web service parameter and GAP UI element. The web service parameter relationship 802 may specify each of the GAP UI element labels of the GAP UI elements used. In another implementation, the relation logic 514 may establish a web service parameter relationship 802 between at least one of the web service parameters 604 (e.g., WS parameter-1608, WS parameter-2 610, and WS parameter-3 612), and at least one of the GAP-1 UI elements 526 (e.g., GAP-1 UI element-1 626, GAP-1 UI element-2 628, and GAP-1 UI element-3 630) or at least one of the GAP-2 UI elements 528 (e.g., GAP-2 UI element-1 634, GAP-2 UI element-2 636, and GAP-2 UI element-3 638). In one implementation, the composite web service definition 702 for a composite web service 202 may include multiple web service parameters defined by a combination of GAP-1 UI elements 526, GAP-2 UI elements 528, and web service parameters 604 (e.g., WS parameter-1 608, WS parameter-2 610, and WS parameter-3 612) of a web service 804. The composition integration design tool system 500 may generate a web service 706 based on the web service definition 704 and the web service parameter relationship 802, and publish the web service 706.

Figure 9:
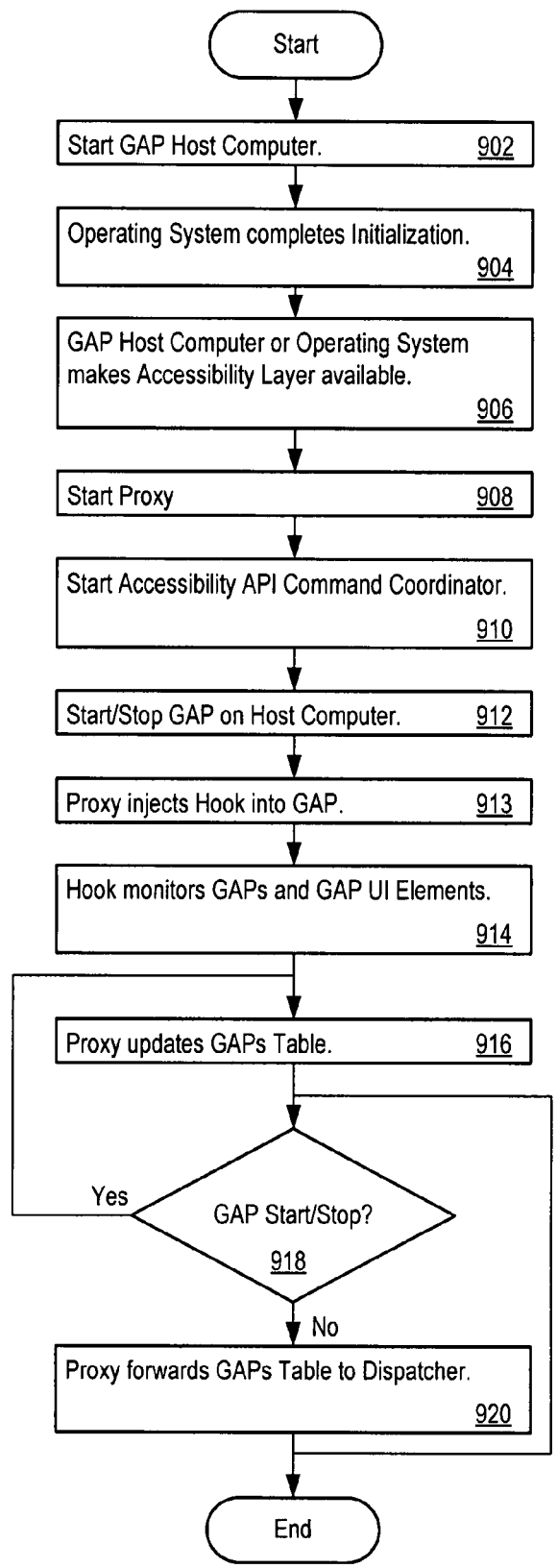
FIG. 9 shows the acts that a proxy may take to register GAPs with a dispatcher.

FIG. 9 shows the acts that a proxy, including the registration logic 326, may take to register GAPs with a dispatcher. Each GAP host computer runs a dedicated proxy that commands and controls the GAPs and UI elements hosted on the GAP host computer through dedicated hooks also hosted on the GAP host computer. The hooks perform actions on the GAPs and UI elements through the accessibility layer. Once the GAP host computer starts (902) and the operating system completes initialization (904), the operating system or GAP host computer makes the accessibility layer available (906). The proxy starts (908), and the proxy initiates the accessibility API command coordinator (910). GAPs start or stop execution on the host computer (912), during the operation of the host computer. The proxy injects (e.g., load) a hook into a GAP after the GAP starts (913). Through the accessibility API command coordinator, the proxy directs the hook to monitor a GAP and GAP UI elements (914). The hook forwards monitored GAP and UI element data and information to the proxy, which updates the GAPs Table (916). If another GAP starts or stops execution (918) the proxy updates the GAPs Table (916). The proxy may periodically forward the GAPs Table to the dispatcher (920).

Figure 10:
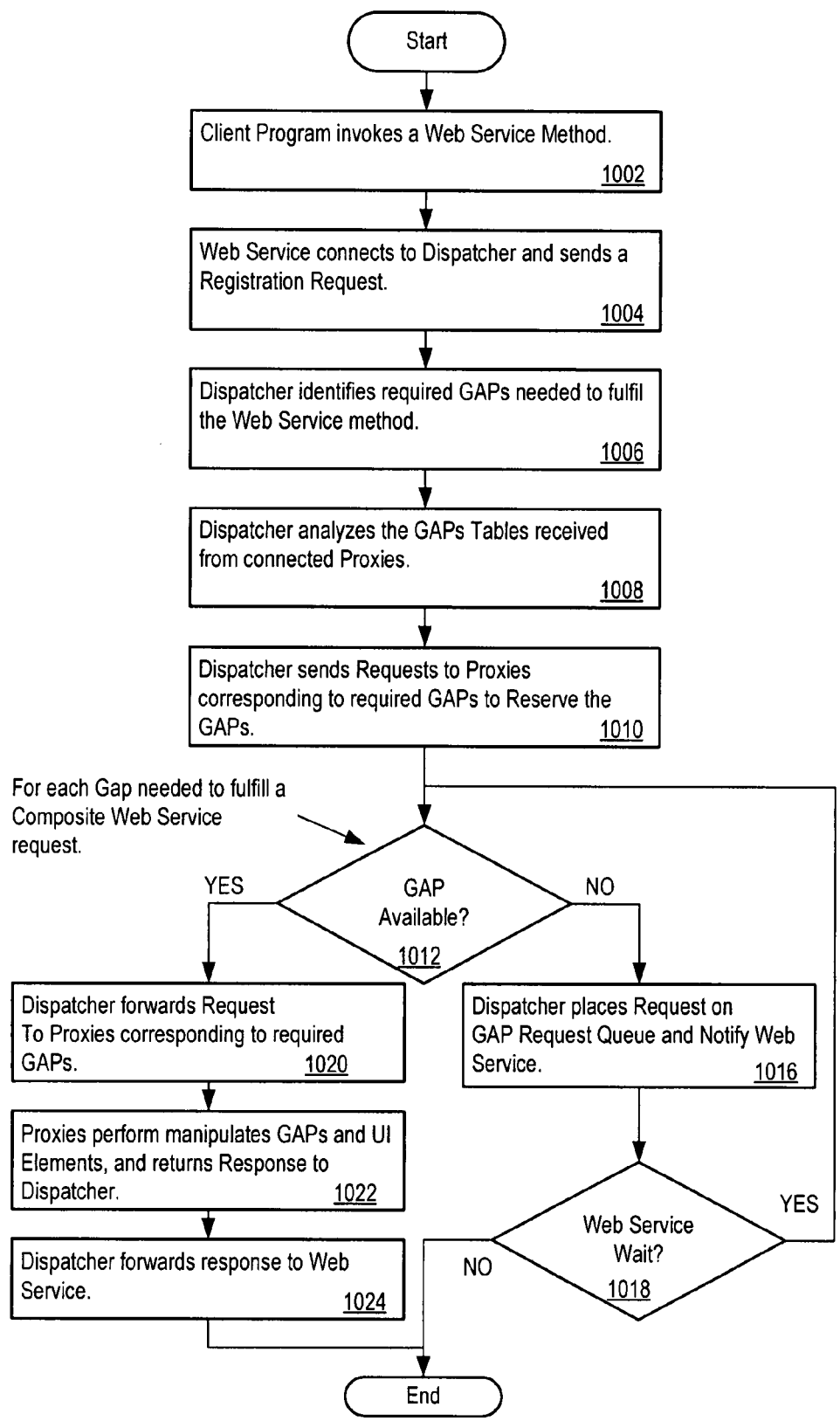
FIG. 10 shows the acts that a dispatcher may take to register a web service, and coordinate communication between web services and proxies.

FIG. 10 shows the acts that a dispatcher may take to register a web service, and coordinate communication between web services and proxies. When a client program invokes a method of a web service or a web service request component (Act 1002), the requesting web service or composite web service (e.g., web service 204 or composite web service 202) to which the method belongs connects to the dispatcher 102, and sends a web services registration request 428 (Act 1004). The dispatcher 102 may determine from the web services registration request 428 the identity of the GAPs required to fulfil the web service or composite web service method (Act 1006). The dispatcher may analyze the GAP Tables received from connected proxies (Act 1008), and sends web service requests or web service request components to the appropriate proxies to reserve the required GAPs (Act 1010). Web service requests and web service request components may include GAP identification data and information about the required GAP, the GAP UI elements, requested actions to perform on the GAP and UI elements, and the information to return to the requesting web service or composite web service. The dispatcher and proxy corresponding to a required GAP may communicate to determine the availability of a GAP (Act 1012). For unavailable GAPs, the dispatcher 102 may place the web service request or web service request component on the dispatchers GAP request queue and notifies the requesting web service or composite web service (e.g., web service 204 or composite web service 202) (Act 1016). The requesting web service or composite web service may determine whether to wait for an unavailable GAP to change status to available (Act 1018). For available GAPs, the dispatcher may forward the web service request or web service request component to the proxies corresponding to the required GAPs (Act 1020). The proxies corresponding to the required GAPs may command and control the GAPs and UI elements according to the web service request or web service request component, and return responses to the dispatcher 102 (Act 1022). The dispatcher may forward responses from proxies to the requesting web service or composite web service, or other web services or composite web services if required (Act 1024).

Figure 11:
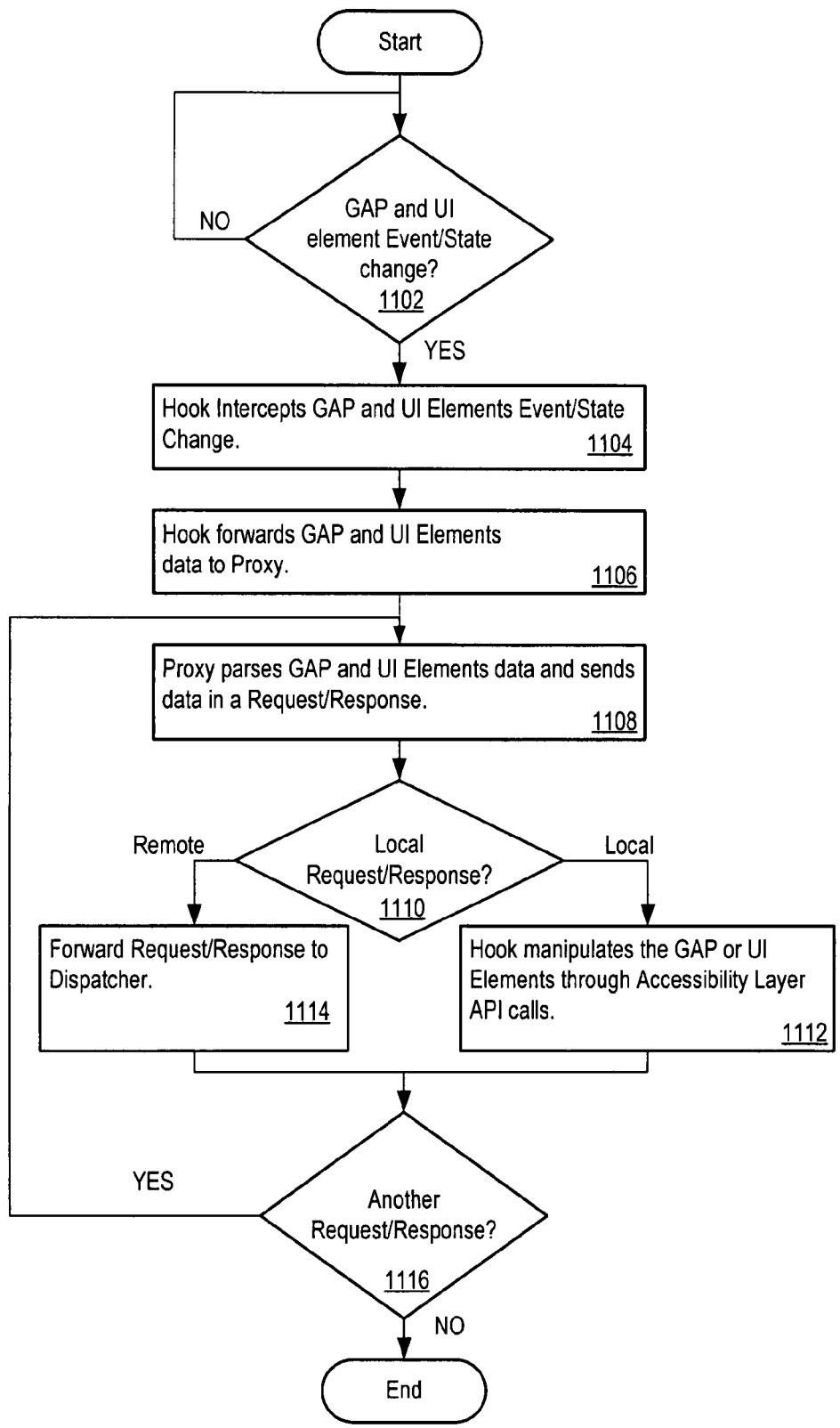
FIG. 11 shows the acts that a hook may take to command and control a UI element.

FIG. 11 shows the acts that a hook may take to command and control a UI element. The hook monitors a GAP and UI elements for event and state changes (Act 1102). When a GAP or UI element event or state changes the hook intercepts the event or state change (Act 1104). The hook forwards GAP and UI element event and state change information to the controlling proxy (Act 1106). The proxy parses GAP and UI element data, and prepares to send information in a request or response to the appropriate destination (Act 1108). The proxy identifies the destination of the request or response as Local or Remote (Act 1110). For Local requests or responses, the proxy forwards the request or response to the hook, and the hook manipulates the GAP or UI elements through accessibility layer API calls (Act 1112). For remote requests or responses, the proxy forwards the request or response to the dispatcher (Act 1114), and the proxy determines whether to parse additional GAP and UI elements data from the hook (Act 1116).

Figure 12:
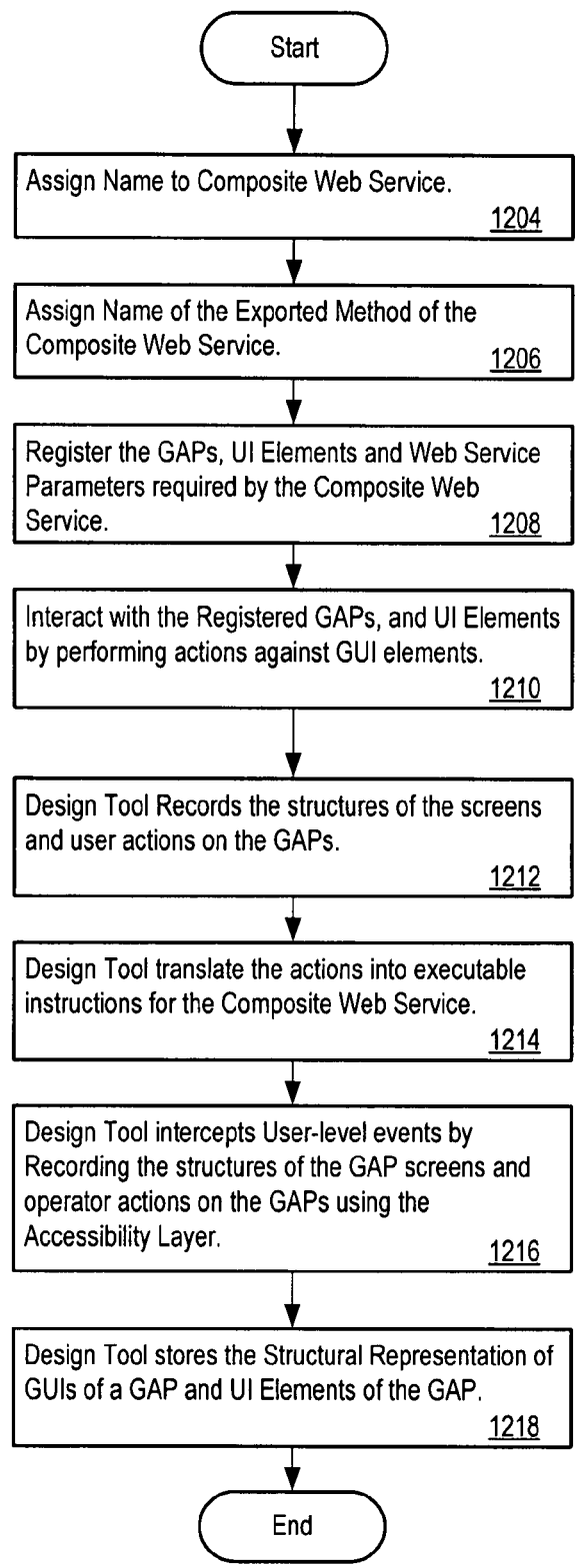
FIG. 12 shows the acts the composition integration design tool system may take to capture the structural representation of GUIs of a GAP and UI elements of the GAP.

FIG. 12 shows the acts the composition integration design tool system may take to capture the structural representation of GUIs of a GAP and UI elements of the GAP. The operator assigns a name to the composite web service (Act 1204), and the operator assigns a name to the exported or published method of the composite web service (Act 1206). The operator registers each GAP, UI element and web service parameters required by the composite web service (Act 1208). The operator interacts with the registered GAPs, UI elements and web service parameters through the design tool's GUI Interface (Act 1210). The design tool captures the structural representation of GUIs of a GAP and UI elements of the GAP through the accessibility layer as a result of the operator interactions with the registered GAPs and UI elements (Act 1212). The design tool may translate the GAP and UI elements actions resulting from the operator interactions into executable instructions for the composite web service (Act 1214). The design tool, through the accessibility layer, records the structures of the GAP screens and operator actions on the GAPs to intercept user-level events (e.g., operator interactions with the GAP and UI elements) (Act 1216). The design tool stores the structural representation of GUIs of a GAP and UI elements of the GAP for use operationally after generating and publishing the composite web service (Act 1218).

FIG. 13 shows a web service creation tool 1300. In FIG. 13, the web service creation tool 1300 may include: a dispatcher 1302; a client program 1304; a web service 1306; a GAP 1 host computer 1308; and external storage 1310. The web service creation tool 1300 components may communicate through the networks 1312 (e.g., the Internet). FIG. 13 also shows the dispatcher 1302 coordinating communication between a single web service 1306 and proxy-1 1314. The dispatcher 1302 acts as an intermediary that enables web services and GAPs to run on separate computers while presenting a common view to client programs 1304. In one implementation of the web service creation tool 1300, when a client program 1304 invokes a web service method corresponding to web service 1306, the web service 1306 sends a web service request to the dispatcher 1302. The dispatcher 1302 may route the web service request to proxy-1 1314 based on GAP identification data and GAP information collected from the proxy-1 1314. The GAP-1 host computer 1308 runs an operating system 1316, provides an accessibility layer 1318, and hosts the proxy-1 1314, the hook-1 1320 and GAP-1 with GUI elements 1322. The operating system 1316 may provide the accessibility layer 1318 with an accessibility API. The proxy-1 1314 registers with the dispatcher 1302 under a unique name, collects GAP identification data and information about the GAP-1 with GUI elements 1322 running with the proxy-1 1314 on the GAP-1 host computer 1308, and sends the GAP identification data and information to the dispatcher 102. In one implementation, when proxy-1 1322 receives a web service request, the proxy-1 1322 interacts with one or more UI elements of the GAP-1 with UI elements 1322 through the hook-1 1320, in response to the web service request. The accessibility layer 1318 may support hook-1 1320 to monitor and control execution of GAP-1 with UI elements 1322, and perform various actions on GAP-1 with UI elements 1322 programmatically.

FIG. 14 shows a structural representation of a GUI of a GAP and UI elements of the GAP. The structural representation of a GUI of a GAP and UI elements of the GAP 1402 may include: a GAP-1 UI element-1 label 1404; a GAP-1 UI element-1 Identifier 1406; location information in the GAP GUI for the GAP UI elements (e.g., GAP-1 UI element-1 location 1408, GAP-1 UI element-2 location 1410, and GAP-1 UI element-3 location 1412); and a GAP GUI screen sequence Representation 1416 for each GAP GUI Screen sequence. The structural representation of GUIs of a GAP and UI elements of the GAP 1402 may represent multiple GAP-1 GUI Screens (e.g., GAP-1 GUI screen sequence-1 1416, GAP-1 GUI screen sequence-2 1418, and GAP-1 GUI screen sequence-3 1420), and encode location information for the GAP-1 with UI elements 1322 (e.g., GAP-1 GUI element-1 encoded location information 1432).

Figure 15:
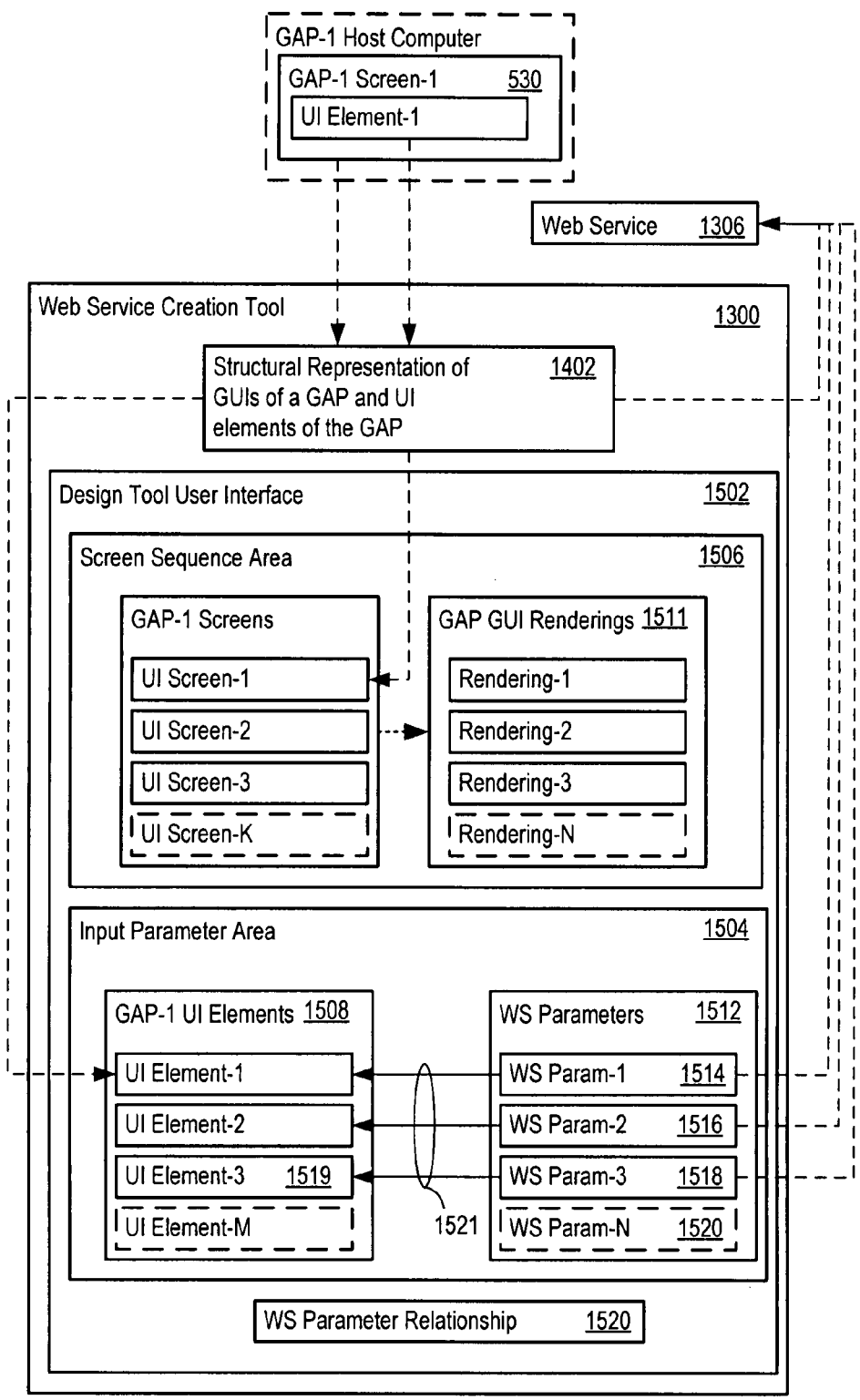
FIG. 15 shows a design tool user interface for a web service creation tool.

FIG. 15 shows a design tool user interface for a web service creation tool. The design tool user interface 1502 may include an input parameter area 1504 and a screen sequence area 1506. The design tool user interface 1502 may include a drag-and-drop interface used to move GAP-1 UI elements 1508 and GAP GUI Screens represented in the structural representation of GUIs of a GAP and UI elements of the GAP 1402 into the input parameter area 1504 and screen sequence area 1506. The design tool user interface 1502 may consider the act of moving GAP-1 UI elements 1508 and GAP GUI Screens represented in the structural representation of GUIs of a GAP and UI elements of the GAP 1402 into the input parameter area 1504 and screen sequence area 1506 as adding objects to or registering objects with the web service definition 1510. The design tool user interface 1502 may highlight a GAP-1 GUI element in the GAP-1 GUI, add the GAP-1 GUI element to the web service definition 1510 or move the GAP-1 GUI element the input parameter area 1504, in response to an operator's selection of a GAP-1 UI element or a GAP GUI Screen represented in the structural representation of GUIs of a GAP and UI elements of the GAP 1402. The web service creation tool 1300 may include a GAP GUI rendering 1511 of a GAP GUI screen sequence illustrating traversal through multiple GAP GUI Screens, and at least one of the web service parameters 1512 (e.g., WS parameter-1 1514, WS parameter-2 1516, and WS parameter-3 1518) for the web service 1306. The design tool user interface 1502 may create a web service parameter relationship 1520 between at least one of the web service parameters 1512 and at least one of the GAP-1 UI elements 1508, and generate the web service 1306 based on the web service definition 1510 and the web service parameter relationship 1520. For example, FIG. 15 shows an arrow 1521 drawn (e.g., by an operator or from input from an automated analysis tool) from WS parameter-3 1518 to GAP-2 UI element-3 1519, which establishes a web service parameter relationship 1520 between a web service parameter and GAP UI element. The design tool user interface 1502 may create additional web service parameter relationships 1512 between the web service 1306 and additional GAP-1 UI elements 1508 as a result of adding the additional GAP-1 UI elements 1508 to the input parameter area 1504. The design tool user interface 1502 may use the accessibility layer 1318 to support the hook-1 1320 to monitor execution of GAP-1 with UI elements 1322, and GAP-1 UI elements 1508 through multiple GAP GUI Screens, and capture the structural representation of GUIs of a GAP and UI elements of the GAP 1402.

Figure 16:
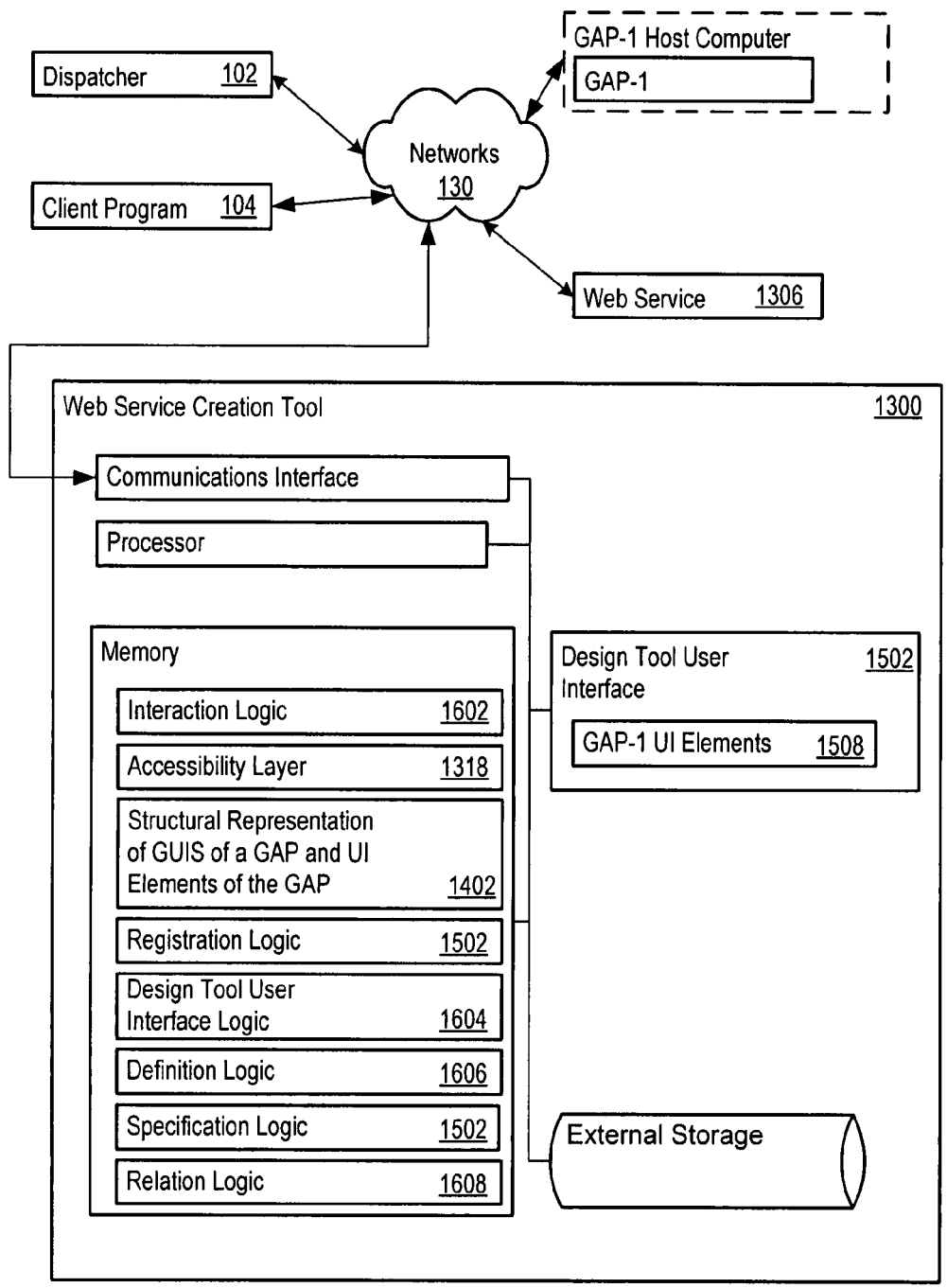
FIG. 16 shows a web service creation tool.

FIG. 16 shows one example implementation of the web service creation tool. The web service creation tool 1300 may include: Interaction logic 1602; design tool user interface logic 1604; definition logic 1606; and relation logic 1608. The Interaction logic 1602 may use the accessibility layer 1318 to capture the structural representation of GUIs of a GAP and UI elements of the GAP 1402. The Interaction logic 1602 may monitor operator interactions with GAP-1 through multiple GAP-1 GUI Screens and GAP UI elements 1508, and establish the structural representation of GUIs of a GAP and UI elements of the GAP 1402 across multiple GAP-1 GUI Screens. The Interaction logic 1602 may also obtain location information and identification information for multiple GAP-1 UI elements 1508, and record the location information and the identification information in the structural representation of GUIs of a GAP and UI elements of the GAP 1402.

The design tool user interface logic 1604 may generate the design tool user interface 1502 that includes the input parameter area 1504 and a screen sequence area 1506, monitor and determine an operator's selection of at least one of the GAP-1 UI elements 1508 in the GAP GUI represented in the structural representation of GUIs of a GAP and UI elements of the GAP 1402, and add the selected GAP-1 UI elements 1508 to the input parameter area 1504. The definition logic 1526 may establish the web service definition with at least one of the web service parameters 1512 (e.g., WS parameter-1 1514, WS parameter-2 1516, and WS parameter-3 1518) that will interact with the at least one of the GAP-1 UI elements 1508. The relation logic 1608 may establish a web service parameter relationship 1520 between at least one of the web service parameters 1512 (e.g., WS parameter-1 1514, WS parameter-2 1516, and WS parameter-3 1518) and at least one of the GAP-1 UI elements 1508. The relations logic 1608 may establish multiple web service parameter relationships 1520 with multiple web service parameters 1512 (e.g., WS parameter-1 1514, WS parameter-2 1516, and WS parameter-3 1518) and each of the GAP-1 UI elements 1508.

Figure 17:
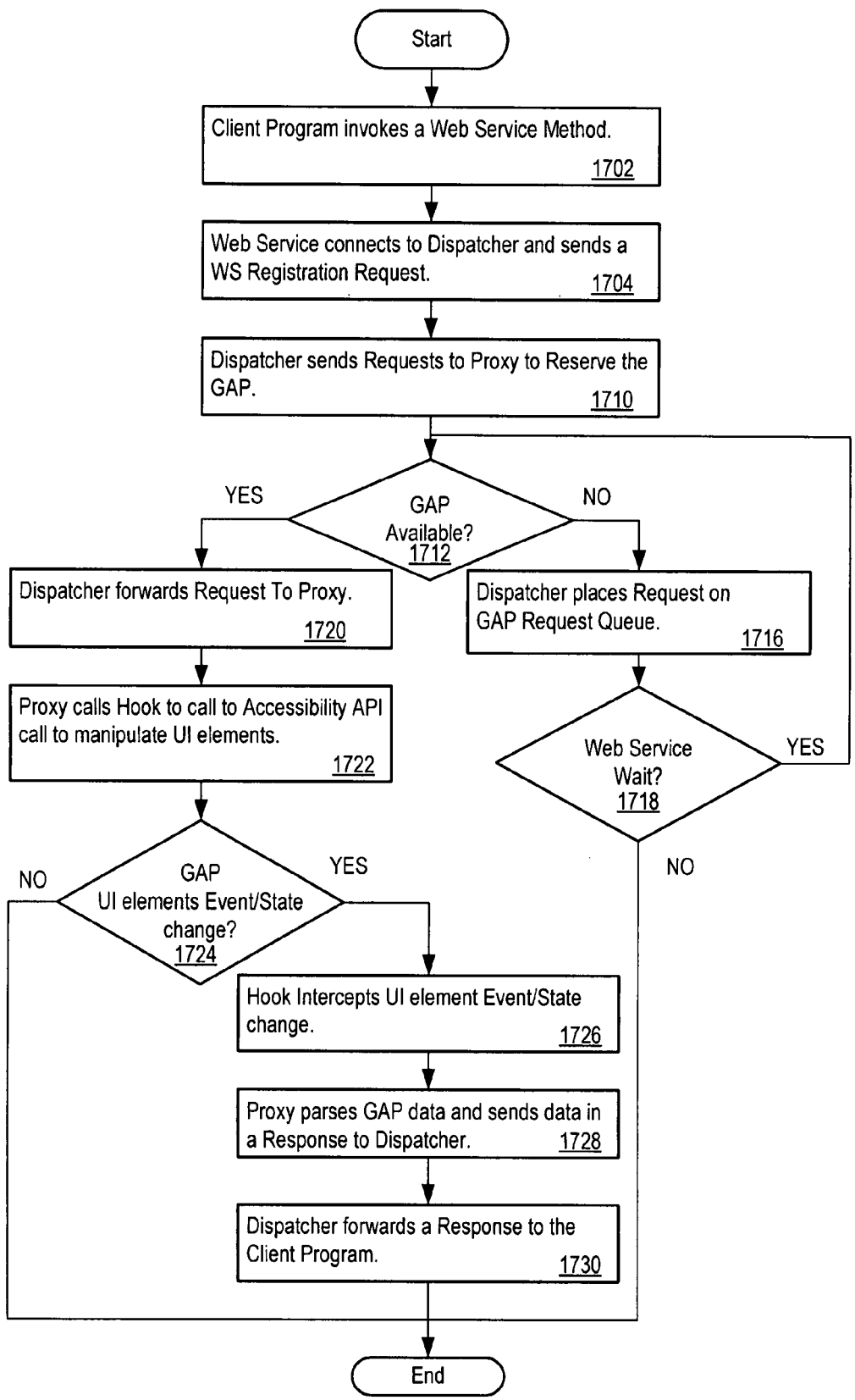
FIG. 17 shows the acts that a proxy and dispatcher may take in a web service creation tool.

FIG. 17 shows the acts that a proxy and dispatcher may take in a web service creation tool. When a client program invokes a method of a web service (Act 1702), the requesting web service (e.g., web service 204) to which the method belongs connects to the dispatcher 102, and sends a web services registration request 428 (Act 1704). The dispatcher 102 may determine from the web service registration request 428 and analyze the GAP Table received from connected proxy the identity of the GAP required to fulfil the web service method, and send web service requests to the proxy to reserve the GAP (Act 1710). Web service requests may include GAP identification data and information about the required GAP, the GAP UI elements, requested actions to perform on the GAP and UI elements, and the information to return to the requesting web service. The dispatcher 102 and proxy corresponding to the required GAP may communicate to determine the availability of the GAP (Act 1712). For an unavailable GAP, the dispatcher 102 may place the web service request on the dispatchers GAP request queue and notifies the requesting web service or composite web service (e.g., web service 204) (Act 1716). The requesting web service may determine whether to wait for the unavailable GAP to change status to available (Act 1718). For an available GAP, the dispatcher may forward the web service request to the proxy (Act 1720). The proxy for the required GAP may command and control the GAP and UI elements according to the web service request, and return responses to the dispatcher 102 (Act 1722). The hook monitors the GAP and UI elements for event and state changes (Act 1724). When a GAP or UI element event or state changes the hook intercepts the event or state change, and forwards GAP and UI element event and state change information to the controlling proxy (Act 1726). The proxy parses GAP and UI element data, and prepares and sends information in a response to the dispatcher (Act 1728). The dispatcher forwards the response to the client program (Act 1730).

Figure 18:
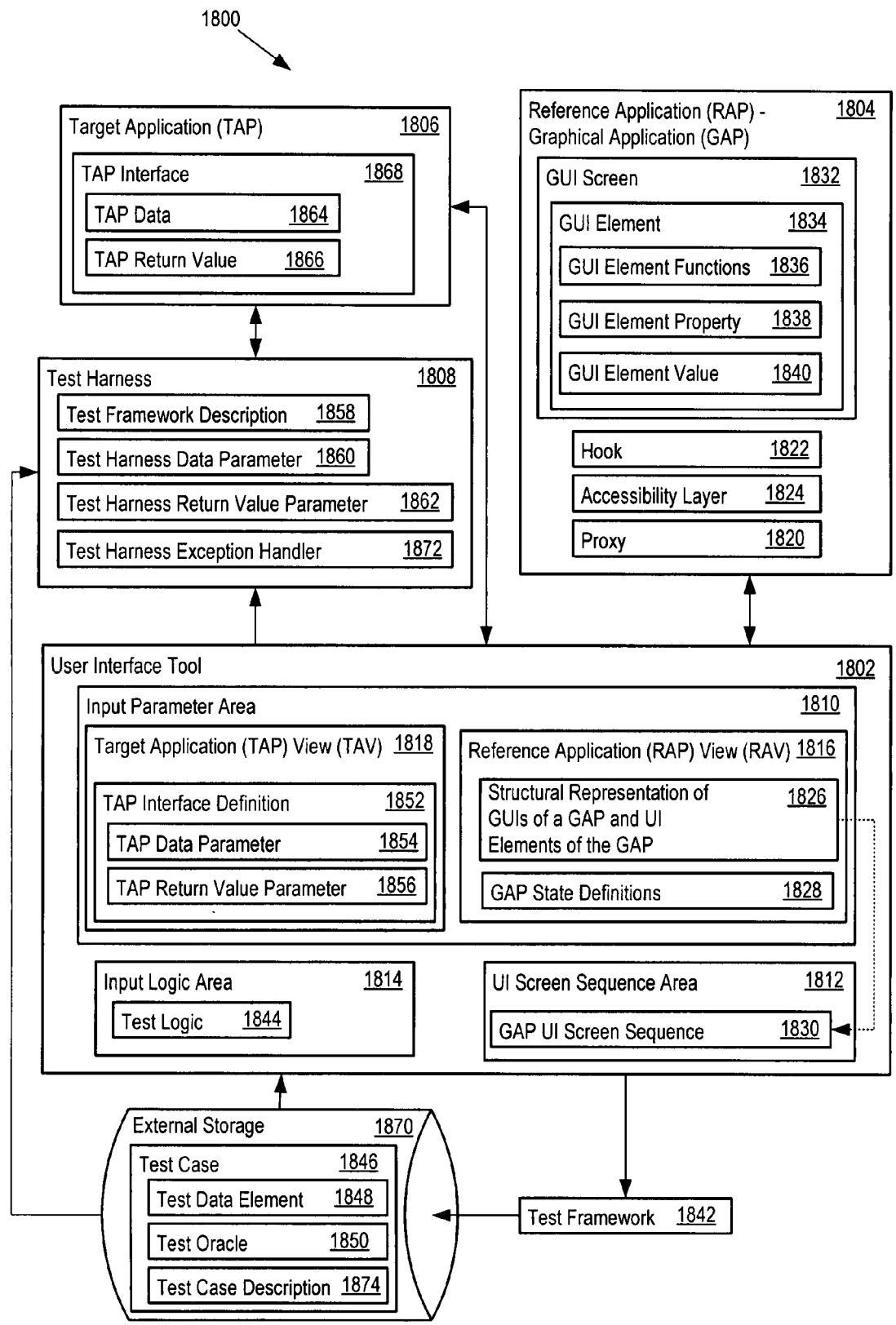
FIG. 18 shows a system for application reference testing (SMART).

FIG. 18 shows one example implementation of the SMART configuration 1800. The SMART configuration 1800 (SMART) may include a user interface tool 1802 in communication with a reference application (RAP) 1804. The RAP 1804 is typically a graphical user interface application (GAP). The SMART configuration 1800 also communicates with a target application (TAP) 1806 through a test harness 1808. In one implementation the TAP 1806 represents a web service based application that requires testing.

The user interface tool 1802 may include: an input parameter area 1810; UI screen sequence area 1812; and input logic area 1814. In one implementation, SMART 1800 may divide the user interface tool 1802 input parameter area 1810 into a reference application (RAP) view (RAV) 1816, and target application (TAP) view (TAV) 1818. The RAV 1816 interacts with the RAP 1804 through a proxy 1820 that controls the RAP 1804 through an accessibility layer 1824 in communication with a hook 1822. The RAV 1816 captures structural representations of a GAP and UI elements of the GAP 1826, and GAP state definitions 1828 through interactions with the RAP 1804. The GAP state definition 1828 may include: a GAP UI screen sequence 1830, a GAP Screen 1832, and a GUI element 1834 associated with the GUI screen 1832. The GAP state definition 1828 may also include various attributes of the GUI element 1834, including: GUI element functions 1836, GUI element property 1838, and GUI element value 1840. The RAV 1816 may establish a test framework 1842 based on the GUI element 1834, GAP state definition 1828, and test logic 1844 defined in the input logic area 1814. The test framework 1842 may define a test case 1846 that includes a test data element 1848 associated with the GUI element 1834, and a test oracle 1850. The test case may associate the test oracle 1850 with the GAP state definition 1828, and test logic 1844 that determine a return value response for the test oracle 1850. The test framework 1842 may include multiple test cases 1846, and the each test case 1846 may include a test case description 1874 that indicates the scope and purpose of a test case.

The user interface tool 1802 input parameter area 1810 target application (TAP) view (TAV) 1818 may capture a TAP interface definition 1852, including: a TAP data parameter 1854, and TAP return value parameter 1856. Once SMART 1800 captures a TAP interface definition 1852 and establishes a test framework 1842, SMART 1800 may establish a test harness 1808 associating the TAP 1806 to the test framework 1842. SMART 1800 may define the test harness 1808 to include a test framework description 1858, a test harness data parameter 1860, and a test harness return value parameter 1862. Test harness may establish a relationship between the test framework 1842 and TAP interface 1864 using the test framework description 1858 to identify the test framework 1842, and corresponding test case 1846 that the test harness 1808 will use to test the TAP 1806. The test harness 1808 may use the test harness data parameter 1860 to establish a relationship between the TAP data parameter 1854 and test data element 1848. The test harness 1808 may also use the test harness return value parameter 1862 to establish a relationship between the TAP return value parameter 1856 and the test oracle 1850. Once SMART 1800 establishes the test harness 1808, which associates the TAP 1806 and test framework 1842, the test harness may send test data corresponding to the test data element 1848 representing TAP data 1864 to the TAP 1806 through the test harness data parameter 1860. The TAP interface 1868 may send the test framework 1842 a TAP return value 1866 through the test harness return value parameter 1862. In response to the TAP return value 1866, the test oracle 1850 may apply test logic 1844 to the TAP return value 1866, and return a test oracle return value to the test harness 1808. SMART 1800 may store the test framework 1842 and test harness in external storage 1870 for reuse and further testing.

Figure 19:
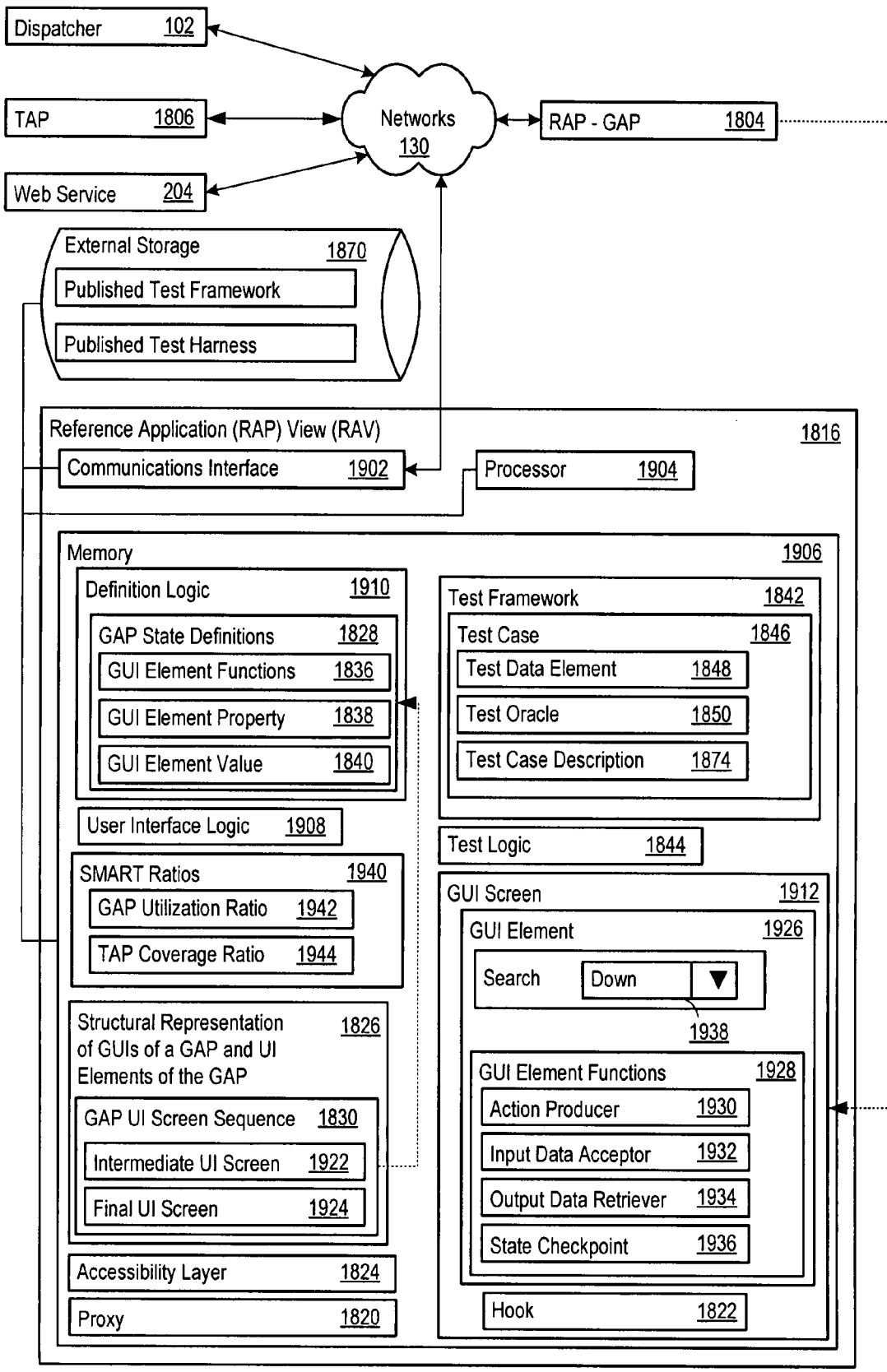
FIG. 19 shows a reference application (RAP) view (RAV) of the SMART user interface tool.

FIG. 19 shows one implementation of the reference application (RAP) view (RAV) 1816 of the SMART 1800 user interface tool 1802. The RAV 1816 may employ a communication interface 1902, processor 1904, and memory 1906 to capture interactions with a RAP 1804 and establish a test framework 1842. The memory 1906 of the RAV 1902 may include: user interface logic 1908, definition logic 1910, a GUI Screen 1912, a SMART GAP ratio 1940, a structural representation of GUIs of a GAP and UI elements of the GAP 1826, test logic 1844, proxy 1820, hook 1822, and accessibility layer 1824. RAV 1816 may use the user interface logic 1908 to generate the user interface tool 1802 that includes the input parameter area 1810, input logic area 1814 and UI screen sequence area 1812. RAV 1816 may use the definition logic 1920 to establish the GAP state definitions 1828, where in addition to defining GUI element functions 1836, GUI element property 1838, and GUI element value 1840, the GAP state definitions 1828 may include a GAP UI screen sequence 1830 that further establishes an intermediate UI screen 1922 and a final UI screen 1924. RAV 1816 may use the intermediate UI screen 1922 and final UI screen 1924 to further define the test oracle 1850.

In one implementation, the RAV 1816 may capture a GUI element 1926 that includes multiple GUI element functions 1928, including: an action producer 1930, input data acceptor 1932, an output data retriever 1934, and a state checkpoint 1936. The GUI element 1926 may include any combination of the GUI element functions 1928. For example, the "Search" pull-down box 1938 GUI element 1926 has a GUI element value 1840 equal to "Down" and the GUI element property the functions of the GUI element 1926 may operate to cause the action producer 1930 function to set a GUI Screen 1912 to scroll in the downward direction, and cause the GAP state to change (e.g., from editing a document to searching a document). In the "Search" pull-down box 1938 example, the output data retriever 1934 function retrieves a list of search options from a container (e.g., listviews and edit boxes) to display in the "Search" pull-down box 1938 (e.g., Up, Down, and All), while the input data acceptor 1932 function receives the selected "Down" value as input data. Following the example above, the state checkpoint 1936 function may indicate an "intermediate" GAP GUI screen state corresponding to the execution of the "Search" function. Alternatively, the state checkpoint 1936 function may indicate a final state or exception state, where the action producer 1930 causes an application to complete an action (e.g., close an application) or result in an error (e.g., invalid input to the input data acceptor 1932).

In one implementation, SMART 1800 may calculate or analyze a SMART ratio 1940. The SMART ratios 1940 may include a GAP utilization ratio 1942 and TAP testing coverage ratio 1944. The GAP utilization ratio 1940 represents a ratio of the number of GUI elements 1832 that SMART 1800 may associate with test data elements 1848 (to substitute as TAP data 1864) to the number of GAP data elements, optionally including non-GUI elements used to run the GAP. For example, if a GAP employs 6,543 data elements (e.g., the total number of both non-GUI elements and GUI elements), and 2,768 of the data elements (GUI elements) may be used as test data, then the GAP utilization ratio is 42.30%. In an alternative implementation, SMART 1800 may establish the TAP testing coverage provided by a GAP. In other words, SMART may determine the TAP testing coverage ratio 1944 that indicates the percentage of TAP functionality that any particular GAP may test. Thus, if the TAP testing coverage ratio is 100%, SMART may extract test cases from a GAP to test 100% of the functionality of a TAP.

A GAP utilization ratio 1942 or TAP testing coverage ratio 1944 that exceeds a pre-selected ratio threshold may indicate the suitability of the GAP as a RAP 1804 for a TAP 1806. SMART 1800 may compare the SMART ratios 1940 against the ratio threshold to determine a suitability result. SMART 1800 may report the suitability result to the operator, who may determine whether to proceed with test extraction based on the suitability results. Alternatively or additionally, SMART 1800 may automatically analyze one or more SMART ratios 1940 from multiple GAPs against the ratio threshold to determine one or more GAPs from which to extract tests. Accordingly, SMART 1800 may use any number of GAPs to build a composite test framework 2502 (see FIG. 25), and may select a set of GAPs based on their GAP utilization ratio 1942 or TAP testing coverage ratio 1944. As examples, an operator may pre-select a ratio threshold of 50%, 75%, or 90%, which may depend on whether the operator desires to extract tests from one or more GAPs or the number of GAPs available to build a comprehensive (i.e., 100% coverage) test framework. An operator may select different two GAPs that individually provide 100% coverage to build a composite test framework 2502 to enhance the quality of the testing.

Figure 25:
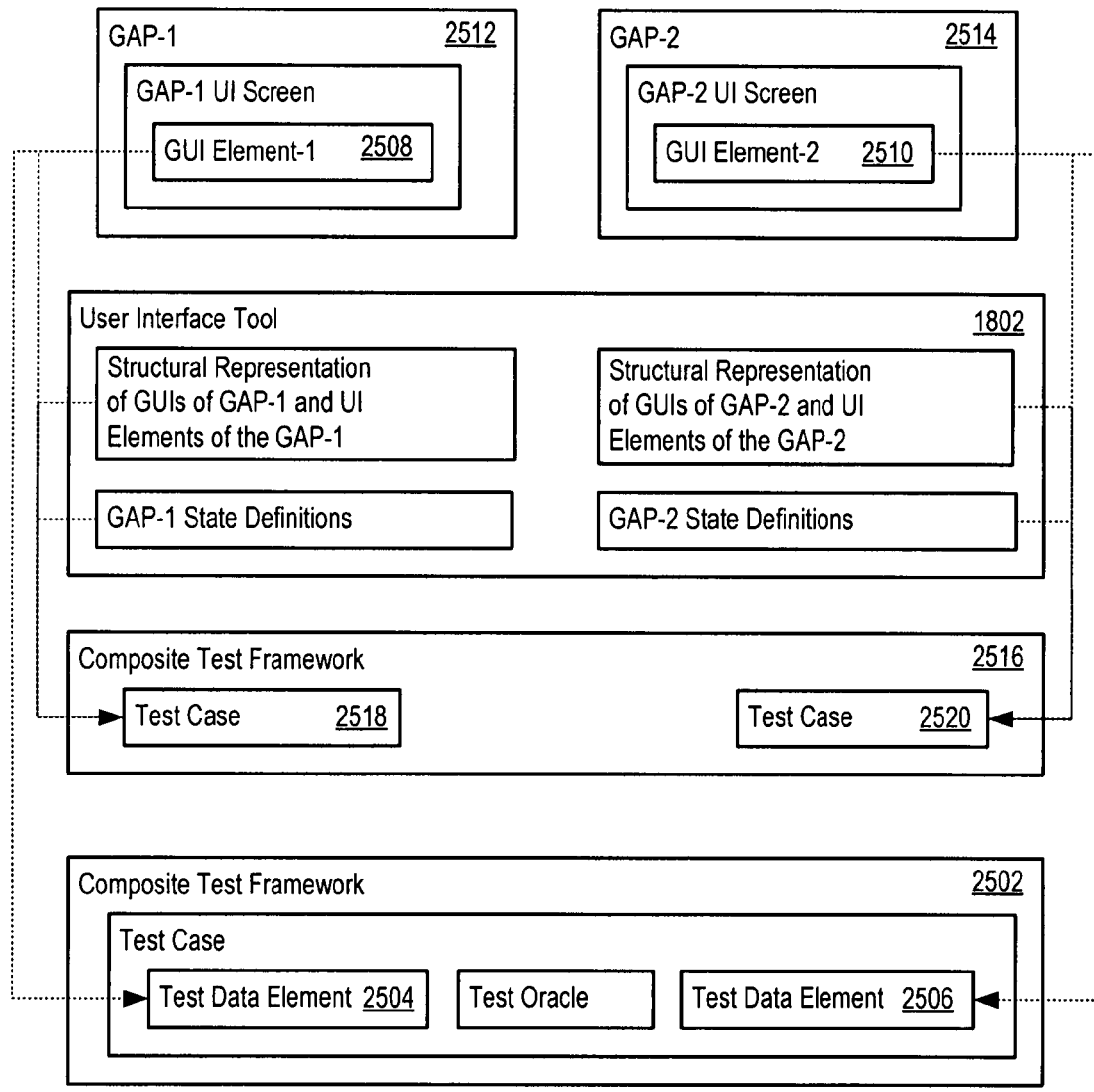
FIG. 25 shows two composite test frameworks each based on a combination of two different GAPs.

FIG. 25 shows two composite test frameworks each based on a combination of two different GAPs. SMART may identify multiple GAPs that combine to exceed a pre-selected ratio threshold, and use the identified GAPs to build a composite test framework 2502. The composite test framework 2502 may include test data element 2504 and test data element 2506 based on GUI element-1 2508 and GUI element-2 2510, respectively, from two different GAPs (e.g., GAP-1 2512 and GAP-2 2514). Alternatively, a composite test framework 2516 may include a test case 2518 based on GAP-1 2512, and a test case 2520 based on GAP-2 2514. However, an operator may build a composite test framework (e.g., composite test framework 2502 or composite test framework 2516) without regard to the SMART ratios 1940.

Figure 20:
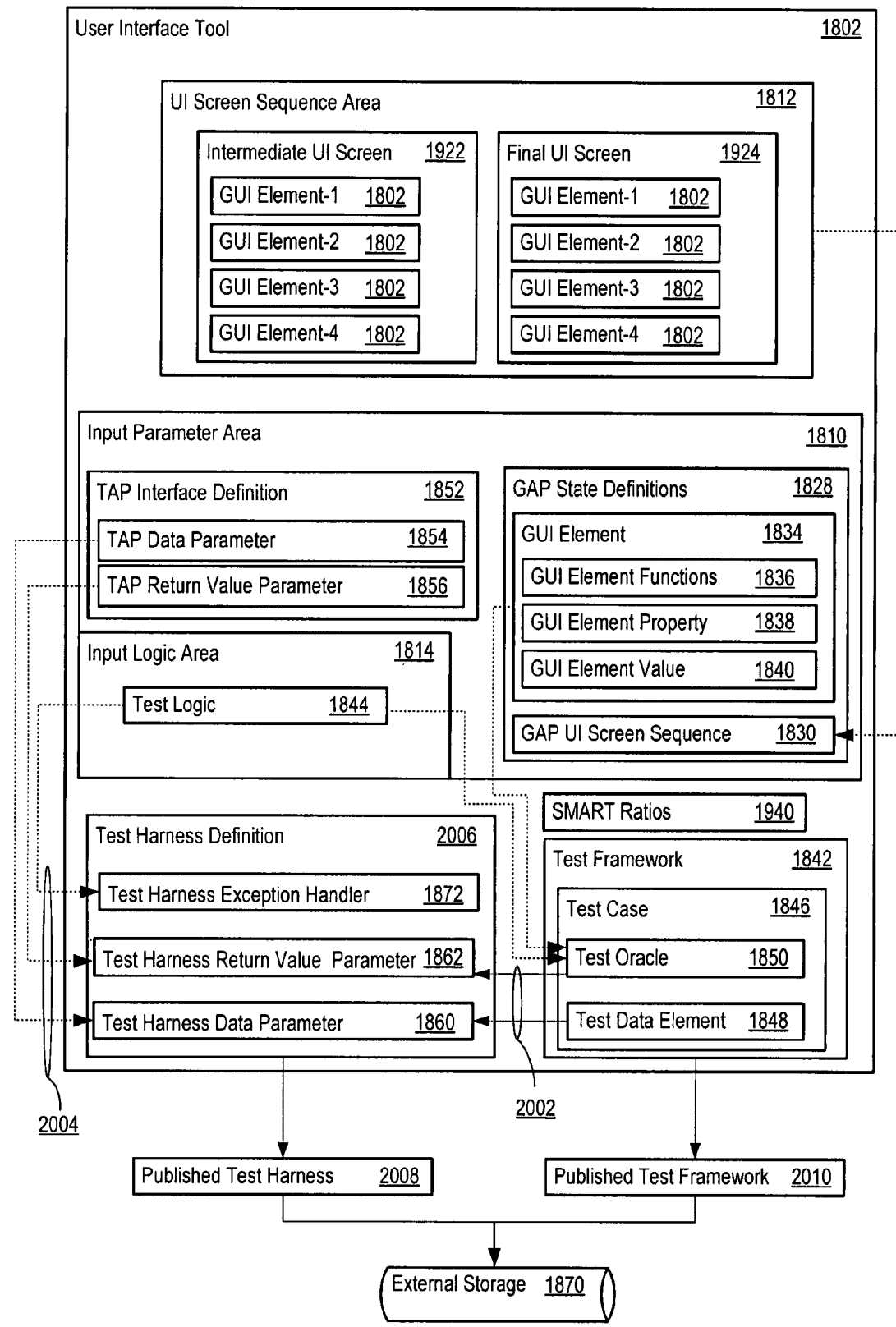
FIG. 20 shows the SMART user interface tool.

FIG. 20 shows one example implementation of the SMART 1800 user interface tool 1802. Once SMART 1800 captures a TAP interface definition 1852 and establishes a test framework 1842, SMART 1800 may establish a test harness 1808 by associating the TAP 1806 to the test framework 1842 by establishing a test harness relationship that includes a framework-to-harness relationship 2002 and a harness-to-TAP relationship 2004. For example, FIG. 20 shows arrows 2002 drawn (e.g., by an operator or from input from an automated analysis tool) from the test framework 1842 test oracle 1850 to the test harness definition 2006 test harness return value parameter 1862, and the test data element 1848 to the test harness data parameter 1860. FIG. 20 further shows arrows 2004 drawn from the TAP interface definition 1852 TAP return value parameter 1856 to the test harness definition 2006 test harness return value parameter 1862, and the TAP data parameter 1854 to the test harness data parameter 1860. The test harness definition 2004 may further establish the test harness exception handler 1872 to include test logic 1844. SMART 1800 may publish the test harness 1808 and store the published test harness 2006 in external storage 1870 for retrieval and reuse.

Figure 21:
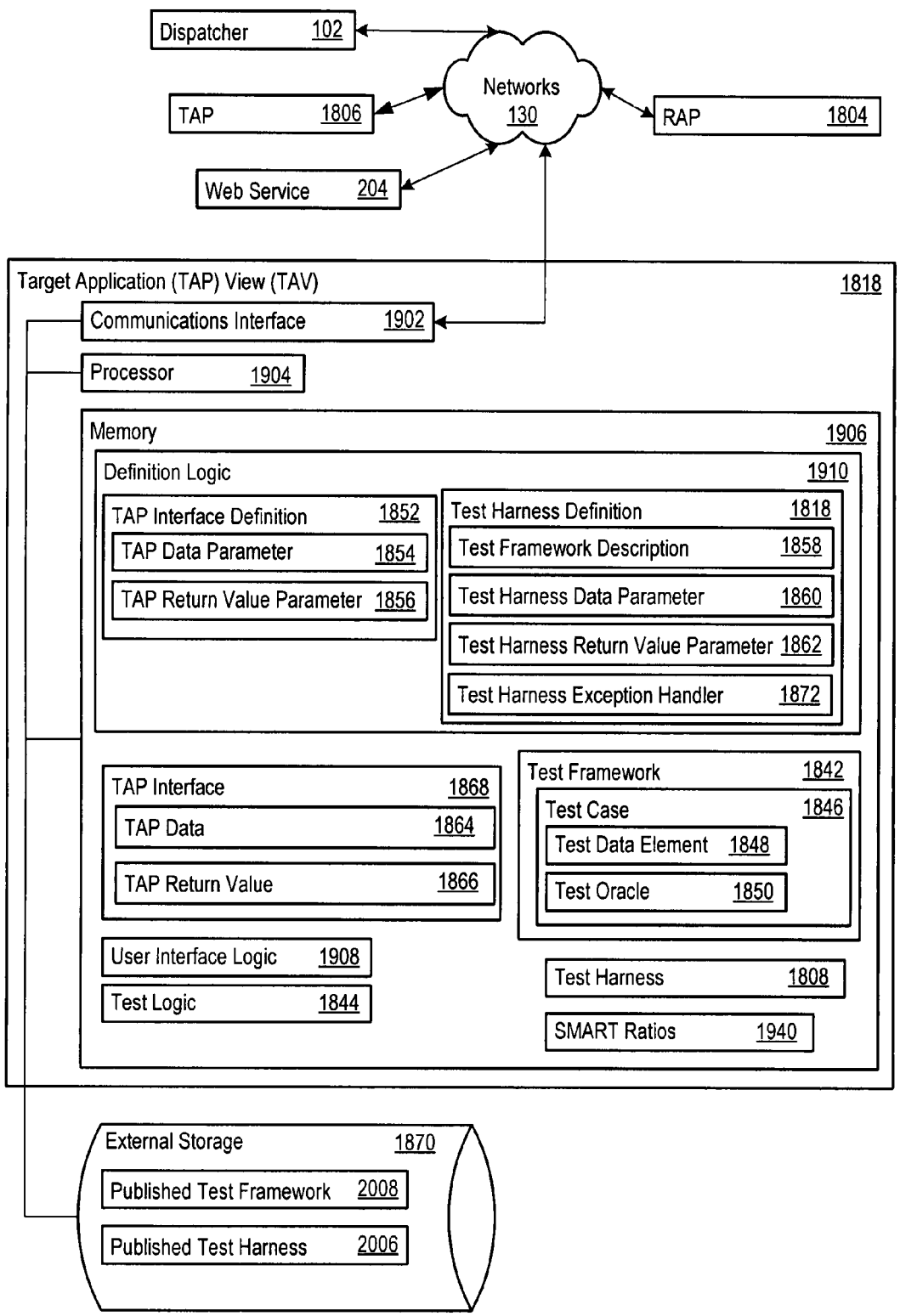
FIG. 21 shows a target application (TAP) view (TAV) of the SMART user interface tool.

FIG. 21 shows a target application (TAP) view (TAV) 1818 of the SMART 1800 user interface tool 1802. TAV 1818 may employ user interaction logic 1908 and definition logic 1910 to capture a TAP interface definition 1852.

Figure 22:
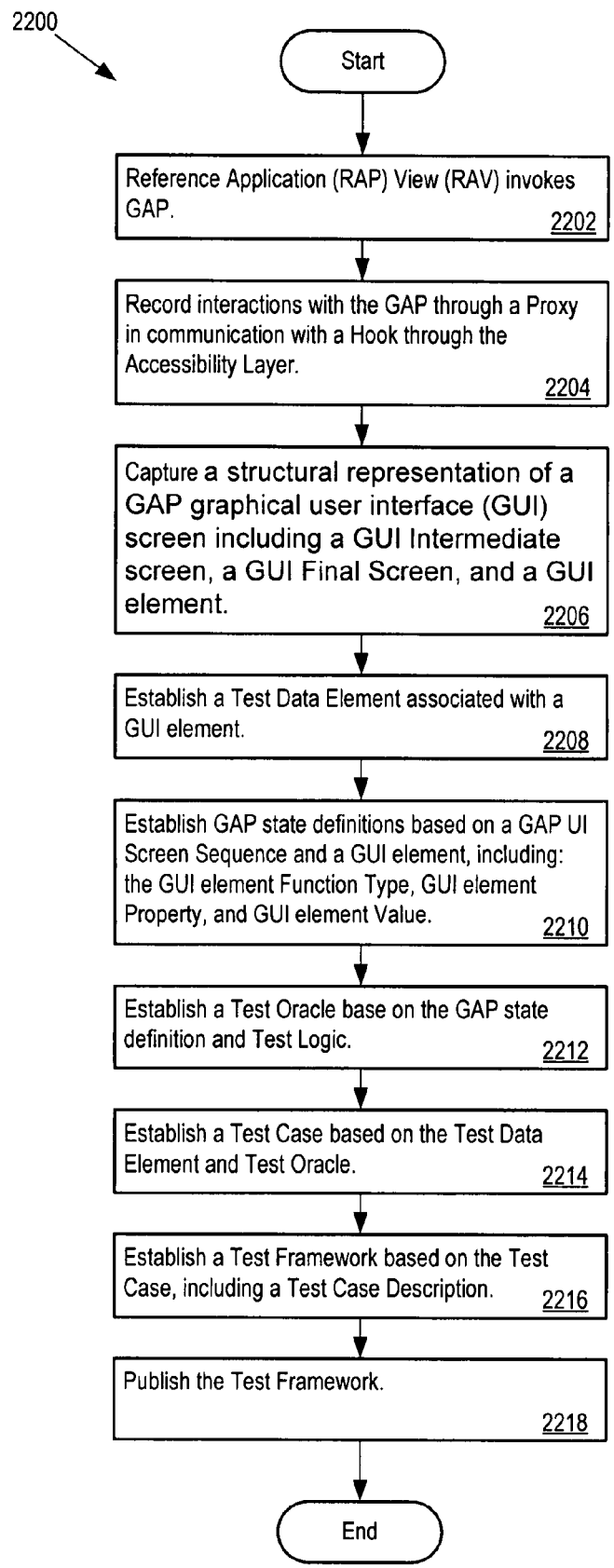
FIG. 22 shows a flow diagram of how SMART may publish a test framework based on interactions with a GAP RAP.

FIG. 22 shows a flow diagram 2200 of how SMART 1800 may build a test framework and make it available. In one implementation, RAV 1816 invokes the GAP 1804 that SMART 1800 will use to establish a test framework 1842 (2202). RAV 1816 may record interactions with the GAP 1804 through the proxy 1820 in communication with a hook 1822 through the accessibility layer 1824 (2204). During the interactions with the GAP 1804, RAV 1816 may capture the structural representation of GUIs of a GAP and UI elements of the GAP 1826, including a GUI intermediate screen 1922, a GUI final screen 1924, and a GUI element 1834 (2206). SMART 1800 may establish a test data element 1848 associated with a GUI element 1834 (2208) to represent TAP data 1864. SMART 1800 may also establish GAP state definitions 1828 based on a GAP UI screen sequence 1830 and the GUI element 1834, including: the GUI element functions 1836, GUI element property 1838, and GUI element value 1840 (Act 2210). RAV 1816 may establish a test oracle 1850 base on the GAP state definitions 1828 and test logic 1844 from the input logic area 1814 (2212). The test logic 1844 may establish logic to test a TAP return value 1866, and determine a return value response for the test oracle 1850. RAV 1816 may establish a test case 1846 based on the test data element 1848 and test oracle 1850 (2214), and establish a test framework 1842 with a test framework description 1858 based on the test case 1846, including a test case description 1874 (2216). SMART 1800 may publish an established test framework 1842 (2218), and store the published test framework in external storage 1870 for reuse with a test harness 1808.

Figure 23:
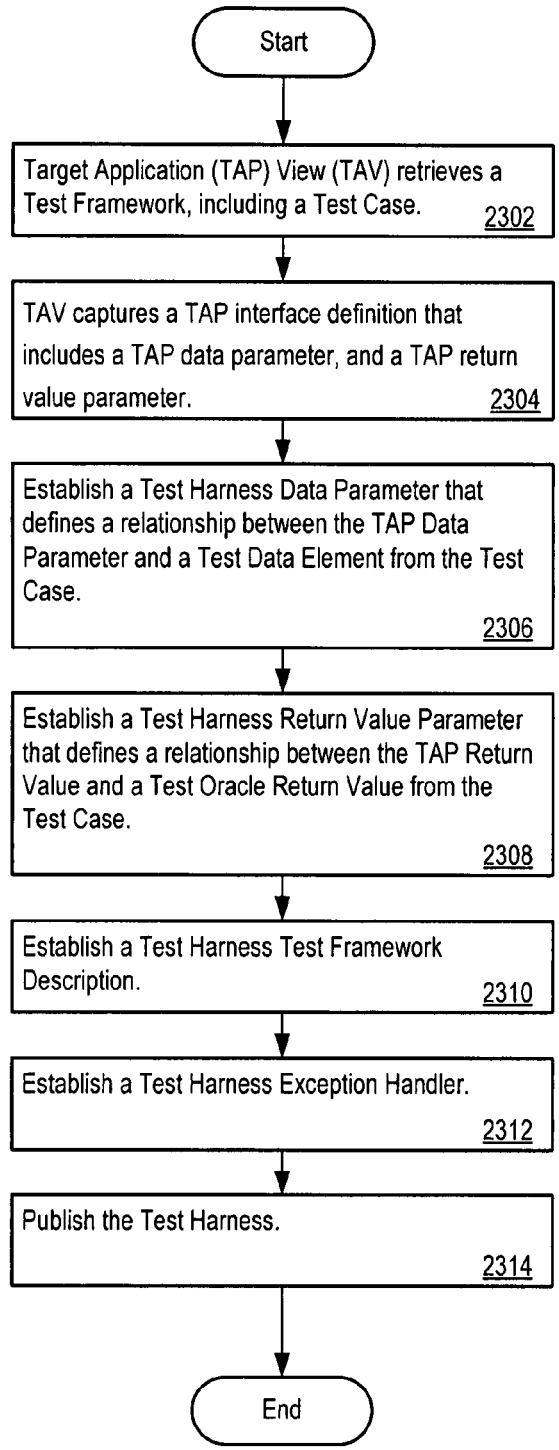
FIG. 23 shows a flow diagram of how SMART may publish a test harness based on a test framework and TAP.

FIG. 23 shows the acts that SMART 1800 may take to publish a test harness 1808 based on a test framework 1842 and TAP 1806. TAV 1818 retrieves a test framework 1842, including a test case 1846 (2302). TAV 1818 captures a TAP interface definition 1852 that includes a TAP data parameter 1854, and a TAP return value parameter 1856 (2304). SMART 1800 may establish a test harness data parameter 1860 that defines a relationship between the TAP data parameter 1854 and a test data element 1848 from the test case 1846 (2306). SMART 1800 may establish a test harness return value parameter 1862 for TAP return value parameter 1856 and test oracle 1850 return values (2308). TAV 1818 may establish the test harness 1808 to include a test framework description 1858 (2310) that indicates the scope and purpose of the test framework 1842. TAV 1818 may also establish a test harness exception handler 1872 (2312) to indicate how to process exceptions from either the test framework 1842 or the TAP 1806 that occur during testing of the TAP 1806. Where SMART 1800 has established a test framework and test harness, SMART 1800 may publish the test harness 1808 (2314), and store the published test harness 1808 in external storage 1870 for reuse with a test framework 1842.

Figure 24:
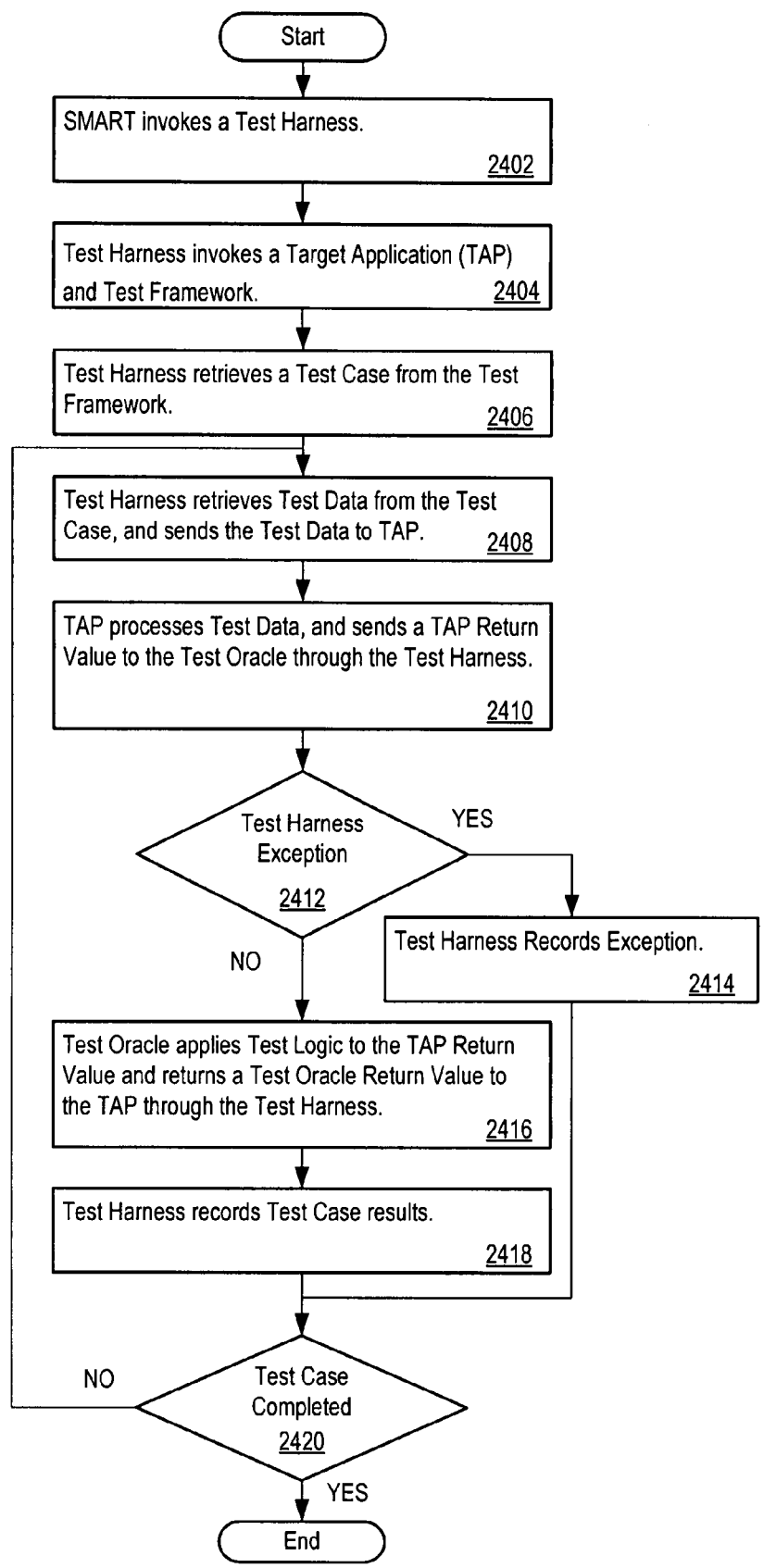
FIG. 24 shows a flow diagram of how SMART may test a TAP with a test harness and test framework.

FIG. 24 shows the acts that SMART 1800 may take to test a TAP 1806 with a test harness 1808 and test framework 1842. In one implementation, SMART 1800 may initiate testing of a TAP 1806 by invoking a previously established test harness 1808 (2402). The test harness may invoke the TAP 1806 and a selected test framework 1842 (2404). The test harness 1808 may retrieve a test case 1846 from the test framework 1842 (2406). The test harness 1808 may retrieve test data associated with a test data element 1848 corresponding to the test case 1846, and send the test data associated with the test data element 1848 to the TAP 1806 (2408) as TAP data 1864. The TAP 1806 may process the test data associated with the test data element 1848, and send a TAP return value 1866 to the test oracle 1850 through the test harness 1808 (2410). The test harness 1808 may evaluate the test harness exception handler 1872 to determine whether an exception has occurred (2412), and the test harness 1808 records the exception if one occurs (2414). For example, where the TAP 1806 fails to process test data associated with a test data element 1848, either because a bug or unhandled condition occurs as a result of the test data, the TAP 1806 may return an unexpected, erroneous or inappropriate response to the test harness 1808, causing the test harness exception handler 1872 to raise an exception. The test harness exception handler 1872 may raise an exception, where the test harness 1808 or the test oracle 1850 experiences an unexpected condition. The test oracle 1850 may apply the test logic 1844 and GAP state definitions 1828 against the TAP return value 1866, received from the TAP 1806 through the test harness 1808 test harness return value parameter 1862, and return a return value to the TAP 1806 through the test harness 1808 (2416). The test harness 1808 records the test case 1846 results (2418) for the test data associated with the test data element 1848, and if the test case 1846 has not completed testing then the test harness 1808 retrieves additional test data associated with the test data element 1848 for the test case 1846 (2408).

Figure 26:
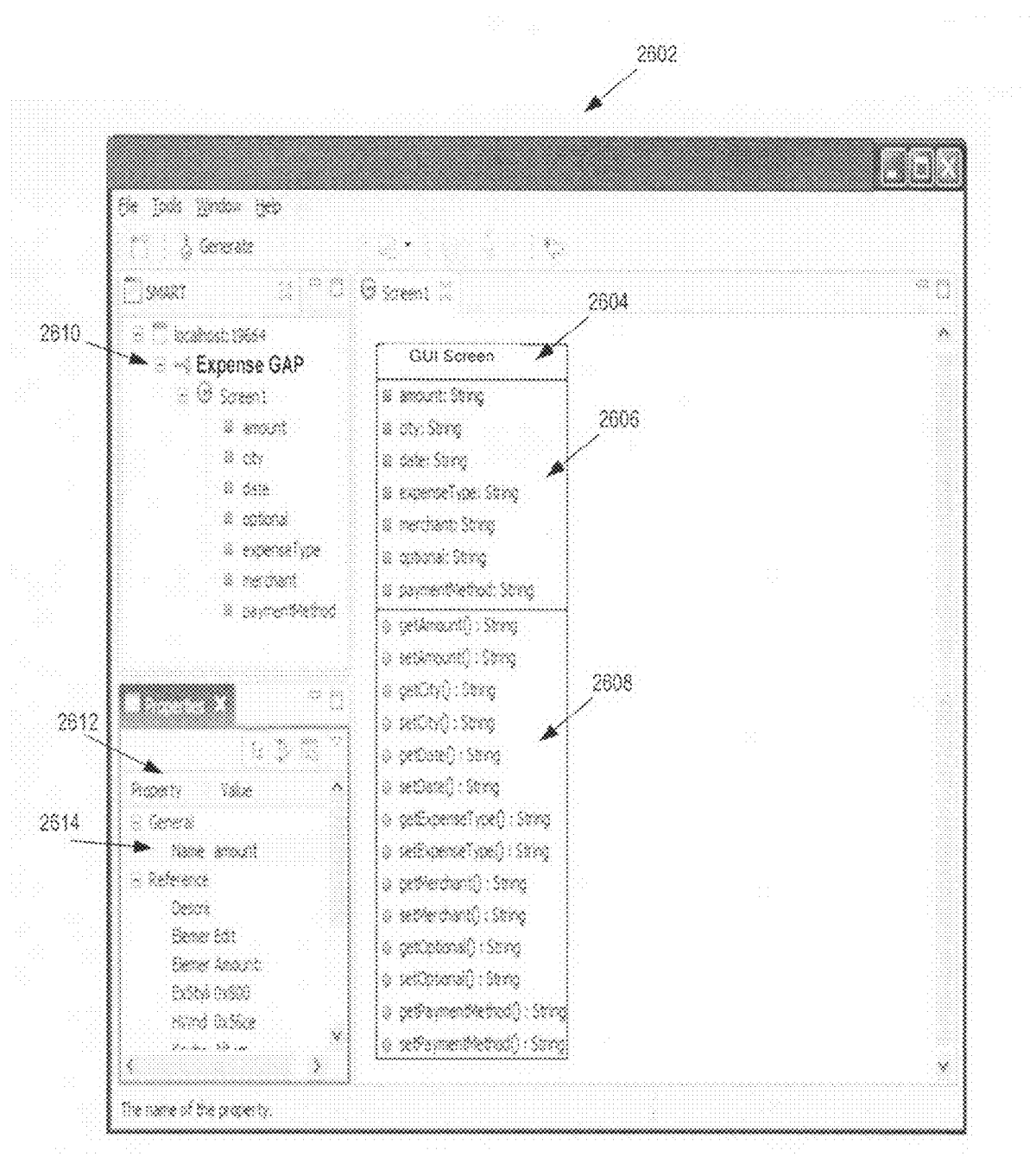
FIG. 26 shows an alternative implementation of the SMART user interface tool.

FIG. 26 shows an alternative implementation of the SMART 1800 user interface tool 2602. FIG. 26 further illustrates a GUI screen 2604, a list of GUI elements 2606, and GUI element functions 2608 that SMART may associate with the GUI elements 2606 for a GAP titled Expense GAP 2610. The GUI element property 2612, shown in FIG. 26, references one of the GUI elements 2606 named amount 2614.

A number of implementations have been described. Nevertheless, it will be understood that various modifications may be made without departing from the spirit and scope of the invention. Accordingly, other implementations are within the scope of the following claims.

What is claimed is:

1. A method for generating a test framework from a graphical user interface application (GAP) to test a target application, comprising:
    capturing and storing in a memory with a processor a target application (TAP) interface of a TAP, comprising:
        a TAP data parameter; and
        a TAP return value parameter;
    generating a user interface including an input parameter area;
    adding the TAP data parameter, and TAP return value parameter to the input parameter area;
    interacting with a GAP through an accessibility layer, during processor execution of the accessibility layer and the GAP from a memory;
    capturing and storing in the memory with the processor a reusable portion of the GAP useable to test the target application, and a structural representation of a GAP graphical user interface (GUI) screen including a GUI element, and a GAP state of the GAP;
    establishing a GAP state definition that defines the GAP state and storing the GAP state definition in the memory with the processor, comprising:
        a function type for the GUI element;
        an element property for the GUI element; and
        an element value for the GUI element;
    establishing a test framework and storing the test framework in the memory with the processor, the test framework comprising:
        a test case specifying an interaction with the GAP through the accessibility layer based on the structural representation of the reusable portion of the GAP useable to test the target application; and
        a test data element comprising an input parameter for the interaction of the test case with the GAP; and
    selecting the test framework through a user interface.

2. The method of claim 1,
    where the GAP state definition comprises any combination of:
        a function type for the GUI element;
        an element property for the GUI element; and
        an element value for the GUI element; and
    where establishing the test framework further comprises:
        creating a test oracle comprising test logic that when executed by the processor determines the test oracle return value responsive to application of the test case to the target application.

3. The method of claim 2, where the function type comprises:
    an action producer function type specifying an action producer function type value and operable to cause a GAP state change to occur where the action producer function type value changes from a first value to a second value;
    an input data acceptor function type operable to receive input data from containers comprising edit boxes;
    an output data retriever function type operable to retrieve data from containers comprising listviews and edit boxes; or
    a state checkpoint function type operable to convey the GAP GUI screen state to the test framework, where the GAP GUI screen state comprises an exception state, an intermediate state, and final state; or
    any combination thereof.

4. The method of claim 1, where the target application comprises a web service executable by the processor.

5. The method of claim 1, further comprising:
    creating, and storing in the memory, a test framework relationship between the test framework and the GAP, comprising:
        a test data element relationship between the test data element and the GUI element;
        a test oracle relationship between the test oracle and the GAP state; and
        a test case relationship between the test data element and the test oracle.

6. The method of claim 5, where the test framework relationship further comprises:
    a test case relationship between the test data element, the test oracle and the GUI screen.

7. The method of claim 1, further comprising:
    publishing the test framework by the processor.

8. The method of claim 1, further comprising:
    publishing the test framework as a web service executable by the processor.

9. The method of claim 1, where the test framework further comprises a test case description.

10. The method of claim 1, where the GUI screen comprises an intermediate GUI screen and where capturing the structural representation includes:
    capturing a screen sequence including the intermediate GUI screen and a final GUI screen.

11. The method of claim 1, further comprising:
establishing a test harness comprising:
- a test harness test framework description that identifies the test framework that the test harness will apply to the TAP;
- a test harness definition comprising:
  - a test harness data parameter; and
  - a test harness return value parameter;
- a test harness relationship between the test harness definition, the TAP interface, and the test framework, comprising:
- a test harness data parameter relationship between the test harness data parameter, the TAP data parameter and the test data element; and
- a test harness return value parameter relationship between the test harness return value parameter, the TAP return value parameter and the test oracle return value.

12. The method of claim 11, further comprising:
publishing the test harness by the processor.

13. The method of claim 11, further comprising:
executing the test framework by the processor.

14. The method of claim 11, further comprising:
determining a GAP ratio for the GAP, the GAP ratio providing a suitability measure for GAP GUI elements for use as test data elements for testing the TAP;
performing a comparison of the GAP ratio to a suitability threshold;
making a recommendation of whether to use the GAP to build the test framework based on the comparison through the user interface executed by the processor.

15. The method of claim 11, where establishing the test harness further comprises:
establishing a test harness exception handler parameter.

16. A product comprising:
a computer readable memory; and
instructions stored on the computer readable memory comprising:
- interaction logic that when executed by a processor causes the processor to capture:
  - a target application (TAP) interface, comprising: a TAP data parameter; and a TAP return value parameter;
  - a reusable portion of the GAP useable to test the target application, and a structural representation of a GAP graphical user interface (GUI) screen including a GUI element, and a GAP state of the GAP using an accessibility layer; and
- user interface logic that when executed by the processor causes the processor to:
  - generate a user interface including an input parameter area, input logic area and a screen sequence area;
  - add the TAP data parameter, and TAP return value parameter to the input parameter area;
  - add the GUI element to the input parameter area; and
  - add the GAP GUI screen to the screen sequence area;
- definition logic that when executed by the processor causes the processor to establish:
  - a GAP state definition that defines the GAP state, comprising:
    - a function type for the GUI element;
    - an element property for the GUI element; and
    - an element value for the GUI element; and
  - a test framework comprising:
    - a test case specifying an interaction with the GAP through the accessibility layer based on the structural representation of the reusable portion of the GAP useable to test the target application; and
    - a test data element comprising an input parameter for the interaction of the test case with the GAP.

17. The product of claim 16, where the test framework further comprises: a test oracle comprising test logic that when executed by the processor causes the processor to determine a test oracle return value responsive to application of the test case to the target application; and
where the user interface logic input logic area is further operable to: add test logic that determines a test oracle return value responsive to application of the test case to the target application.

18. The product of claim 16, where the function type comprises:
- an action producer function type specifying an action producer function type value and operable to cause a GAP state change to occur where the action producer function type value changes from a first value to a second value;
- an input data acceptor function type operable to receive input data from containers comprising edit boxes;
- an output data retriever function type operable to retrieve data from containers comprising listviews and edit boxes; or
- a state checkpoint function type operable to convey the GAP GUI screen state to the test framework, where the GAP GUI screen state comprises an exception state, an intermediate state, and final state; or
- any combination thereof.

19. The product of claim 18, where the test framework relationship further comprises:
a test case relationship between the test data element, the test oracle and the GUI screen.

20. The product of claim 16, where the definition logic when executed by the processor further causes the processor to:
establish a test framework relationship between the test framework and the GAP, comprising:
- a test data element relationship between the test data element and the GUI element;
- a test oracle relationship between the test oracle and the GAP state; and
- a test case relationship between the test data element and the test oracle.

21. The product of claim 16, further comprising a test harness comprising:
- a test harness test framework description that identifies the test framework that the test harness will apply to the TAP;
- a test harness data parameter;
- a test harness return value parameter;
- a test harness relationship between the test harness definition, the TAP interface, and the test framework, comprising:
- a test harness data parameter relationship between the test harness data parameter, the TAP data parameter and the test data element; and
- a test harness return value parameter relationship between the test harness return value parameter, the TAP return value parameter and the test oracle return value.

22. A test generation system comprising:
a memory comprising:
- a structural representation of a GAP graphical user interface (GUI) screen including a GUI element, and a GAP state of the GAP;

interaction logic operable to capture:
  a target application (TAP) interface in the memory comprising: a TAP data value; and a TAP return value;
  a reusable portion of the GAP useable to test the target application, and a structural representation of the GAP GUI screen including the GUI element using an accessibility layer;
user interface logic operable to:
  generate a user interface including:
    an input parameter area;
    an input logic area; and
    a screen sequence area;
  add the TAP data value, and TAP return value to the input parameter area;
definition logic operable to establish:
  a GAP state definition that defines the GAP state in the memory, comprising:
    a function type for the GUI element;
    an element property for the GUI element; and
    an element value for the GUI element; and
  a test framework in the memory comprising:
    a test case specifying an interaction with the GAP through the accessibility layer based on the structural representation of the reusable portion of the GAP useable to test the target application;
    a test data element comprising an input parameter for the interaction of the test case with the GAP; and
    a test oracle comprising test logic that determines a test oracle return value responsive to application of the test case to the target application; and
a processor coupled to the memory and operable to execute the test framework.

23. The system of claim 22, where the function type comprises:
  an action producer function type specifying an action producer function type value, operable to cause a GAP state change to occur where the action producer function type value changes from a first value to a second value;
  an input data acceptor function type operable to receive input data from containers comprising edit boxes;
  an output data retriever function type operable to retrieve data from containers comprising listviews and edit boxes; or
  a state checkpoint function type operable to convey the GAP GUI screen state to the test framework, where the GAP GUI screen state comprises an exception state, an intermediate state, and final state; or
  any combination thereof.

24. The system of claim 22, where the definition logic is further operable to:
  establish a test framework relationship between the test framework and the GAP, comprising:
    a test data element relationship between the test data element and the GUI element;
    a test oracle relationship between the test oracle and the GAP state; and
    a test case relationship between the test data element and the test oracle.

25. The system of claim 22, further comprising:
  a test framework database comprising:
    the test data element;
    the test oracle; and
    the test case;
  where the GAP state definition comprises:
    a function type for the GUI element;
    an element property for the GUI element; and
    an element value for the GUI element;
  where the processor is further coupled to the test framework database the memory further comprises:
  the definition logic is further operable to establish:
    a test harness comprising:
      a test harness test framework description that identifies the test framework that the test harness will apply to the TAP;
      a test harness data parameter;
      a test harness return value parameter;
      a test harness relationship between the test harness definition, the TAP interface, and the test framework, comprising:
        a test harness data parameter relationship between the test harness data parameter, the TAP data parameter and the test data element; and
        a test harness return value parameter relationship between the test harness return value parameter, the TAP return value parameter and the test oracle return value.

26. The system of claim 22, where the memory further comprises proxy logic operable to interact with the GAP through the accessibility layer in communication with a hook into the GAP.

* * * * *

UNITED STATES PATENT AND TRADEMARK OFFICE
CERTIFICATE OF CORRECTION

| | | |
|---|---|---|
| PATENT NO. | : 7,979,846 B2 | Page 1 of 1 |
| APPLICATION NO. | : 11/784121 | |
| DATED | : July 12, 2011 | |
| INVENTOR(S) | : Mark Grechanik et al. | |

It is certified that error appears in the above-identified patent and that said Letters Patent is hereby corrected as shown below:

In the Specification

In column 12, line 54, after "(e.g., WS" replace "parameter-1608" with --parameter-1 608--.

Signed and Sealed this
Twenty-fifth Day of October, 2011

David J. Kappos
*Director of the United States Patent and Trademark Office*